US012602908B2

(12) United States Patent
Watanabe

(10) Patent No.: US 12,602,908 B2
(45) Date of Patent: Apr. 14, 2026

(54) INFORMATION PROCESSING DEVICE, INFORMATION PROCESSING METHOD, AND A NON-TRANSITORY COMPUTER READABLE RECORDING MEDIUM INCLUDING SELECTING A BASE IMAGE INCLUDING A TARGET REGION WITH AN OBJECT SUBJECT TO MACHINE LEARNING AND FOR COMBINATION WITH ANOTHER TARGET REGION IN ANOTHER IMAGE TO INCLUDE IN A DATASET FOR TRAINING A MACHINE LEARNING MODEL

(71) Applicant: NEC Corporation, Tokyo (JP)

(72) Inventor: Yoshikazu Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 544 days.

(21) Appl. No.: 18/016,602

(22) PCT Filed: Jul. 27, 2020

(86) PCT No.: PCT/JP2020/028622
§ 371 (c)(1),
(2) Date: Jan. 17, 2023

(87) PCT Pub. No.: WO2022/024165
PCT Pub. Date: Feb. 3, 2022

(65) Prior Publication Data
US 2023/0281967 A1    Sep. 7, 2023

(51) Int. Cl.
*G06V 10/776*        (2022.01)
*G06V 10/22*         (2022.01)
(Continued)

(52) U.S. Cl.
CPC ............ *G06V 10/774* (2022.01); *G06V 10/22* (2022.01); *G06V 10/267* (2022.01); *G06V 10/7715* (2022.01); *G06V 10/776* (2022.01)

(58) Field of Classification Search
CPC ........ G06T 7/00; G06V 10/22; G06V 10/267; G06V 10/454; G06V 10/764;
(Continued)

(56) References Cited

U.S. PATENT DOCUMENTS

2019/0197356 A1*  6/2019  Kurita ................. G06F 18/2178
2020/0117991 A1*  4/2020  Suzuki .................. G06V 20/69
2021/0264314 A1*  8/2021  Oura ........................ G06N 5/04

FOREIGN PATENT DOCUMENTS

JP        2015-148895  A        8/2015
JP        2019-114116  A        7/2019
(Continued)

OTHER PUBLICATIONS

International Search Report for PCT Application No. PCT/JP2020/028622, mailed on Oct. 20, 2020.
(Continued)

*Primary Examiner* — Chad Dickerson
(74) *Attorney, Agent, or Firm* — Sughrue Mion, PLLC

(57)        ABSTRACT

An information processing device according to the present invention performs operations including: selecting a base image from a base dataset including a target region including an object to be subjected to machine learning and a background region not including an object to be subjected to machine learning, and generating a processing target image; selecting the target region included in another image included in the base dataset; combining an image of the selected target region and information on an object to be subjected to machine learning included in the image of the
(Continued)

target region with the processing target image; generating a dataset of the processing target images obtained by combining a predetermined number of the target regions; calculating a feature of an image included in the dataset; generating a learned model using first machine learning using the feature and the dataset; and outputting the generated learned model generated.

10 Claims, 18 Drawing Sheets

(51) Int. Cl.
*G06V 10/26*          (2022.01)
*G06V 10/77*          (2022.01)
*G06V 10/774*         (2022.01)
*G06T 7/00*           (2017.01)

(58) Field of Classification Search
CPC ............. G06V 10/766; G06V 10/7715; G06V 10/774; G06V 10/776; G06V 10/82
USPC ......................................................... 382/159
See application file for complete search history.

(56)          References Cited

FOREIGN PATENT DOCUMENTS

| JP | 2019-185751 A | 10/2019 |
| JP | 2020-027424 A | 2/2020 |
| WO | 2019/021855 A1 | 1/2019 |

OTHER PUBLICATIONS

English translation of Written opinion for PCT Application No. PCT/JP2020/028622, mailed on Oct. 20, 2020.
Shaoqing Ren, Kaiming He, Ross Girshick, Jian Sun, "Faster R-CNN: Towards Real-Time Object Detection with Region Proposal Networks", [online], Jan. 6, 2016, Cornel University, [Searched on Oct. 16, 2019], Internet, <URL:https://arxiv.org/abs/1506.01497>.
Wei Liu, Dragomir Anguelov, Dumitru Erhan, Christian Szegedy, Scott Reed, Cheng-Yang Fu, Alexander C. Berg, "SSD: Single Shot MultiBox Detector", [online], Dec. 29, 2016, Cornel University, [Searched on Oct. 16, 2019], Internet, <URL:https://arxiv.org/a5bs/1512.02325>.
Tsung-Yi Lin, Priya Goyal, Ross Girshick, Kaiming He, Piotr Dollar, "Focal Loss for Dense Object Detection", [online], Feb. 2, 2018, Cornel University, [Searched on Oct. 16, 2019], Internet, <URL:https//arxiv.org/abs/1708.02002>.

* cited by examiner

Figure 2:
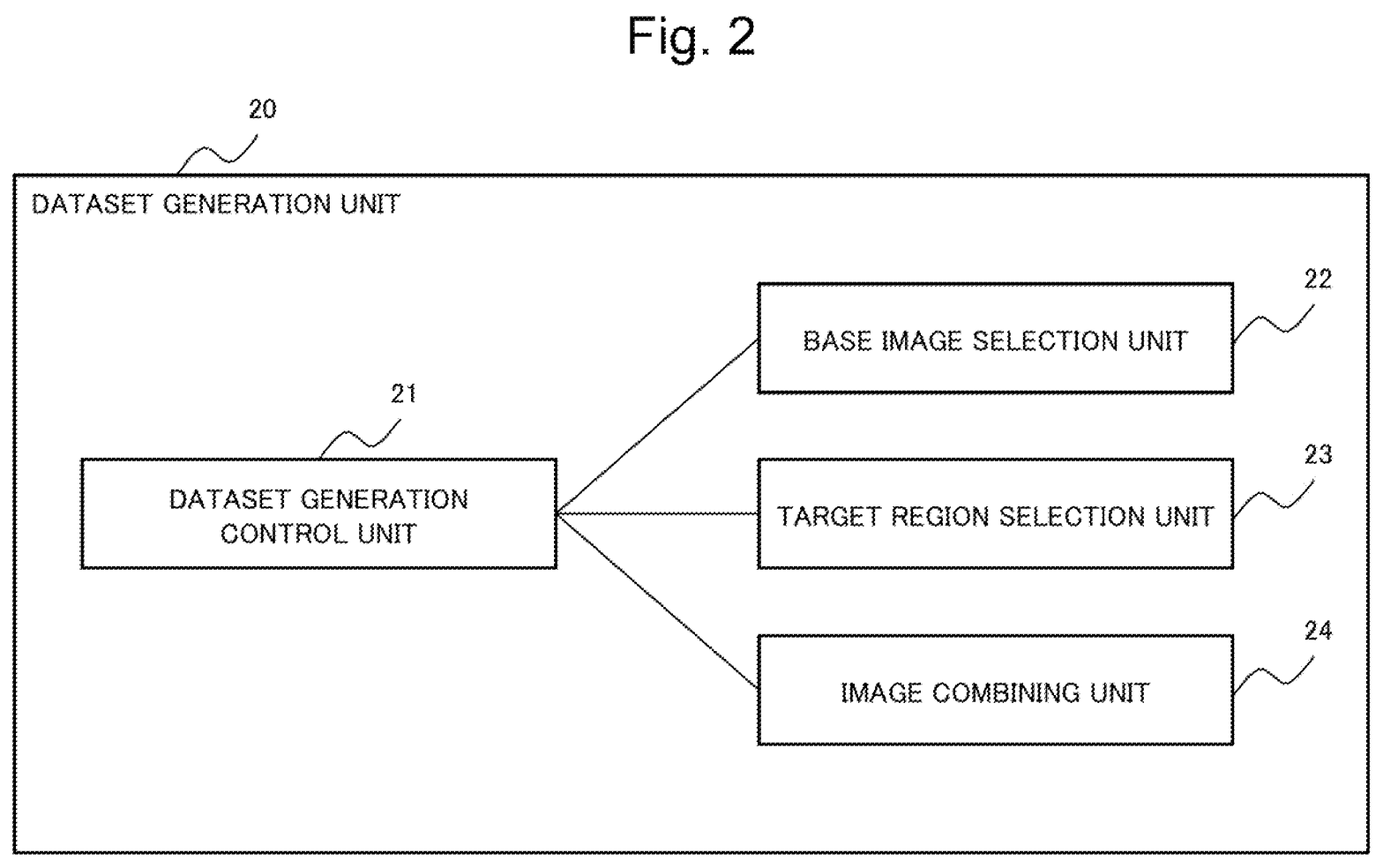

20 DATASET GENERATION UNIT

22 BASE IMAGE SELECTION UNIT

23 TARGET REGION SELECTION UNIT

24 IMAGE COMBINING UNIT

21 DATASET GENERATION CONTROL UNIT

Fig. 3

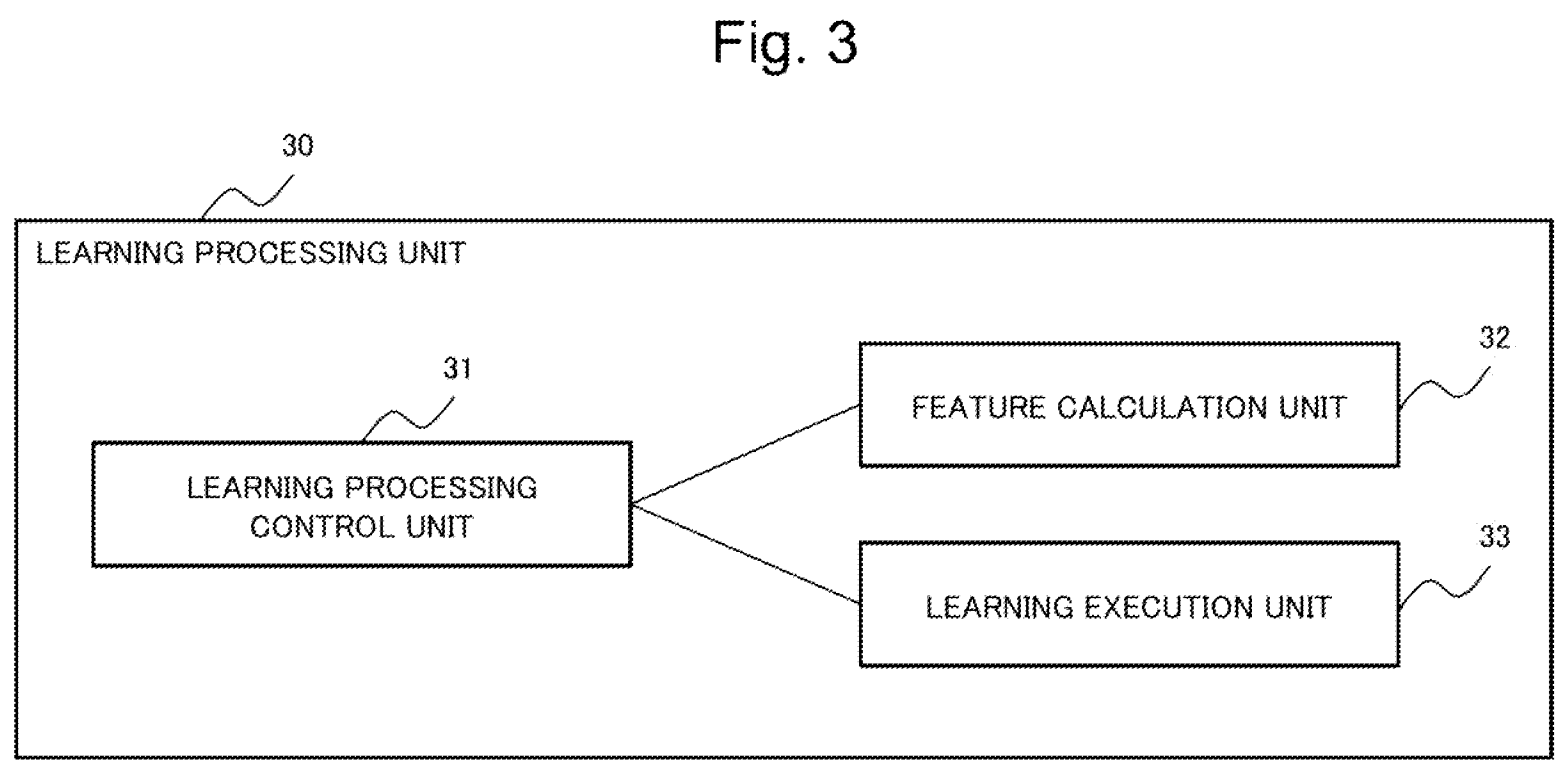

30 LEARNING PROCESSING UNIT

31 LEARNING PROCESSING CONTROL UNIT

32 FEATURE CALCULATION UNIT

33 LEARNING EXECUTION UNIT

Fig. 4

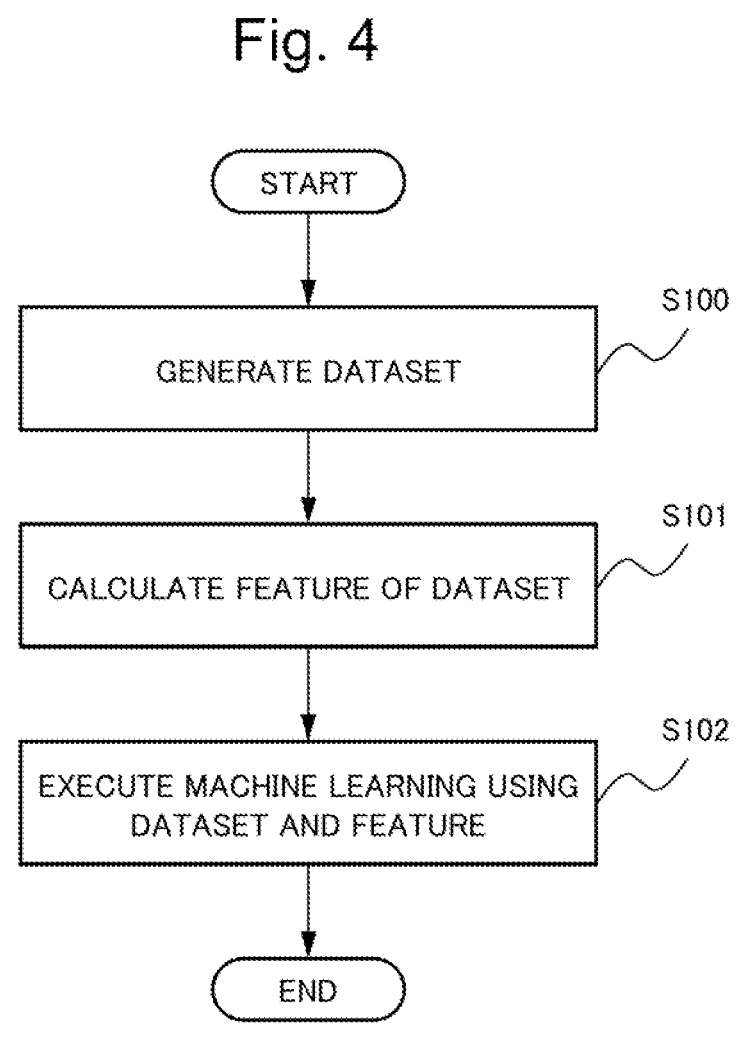

START

↓

GENERATE DATASET                                    S100

↓

CALCULATE FEATURE OF DATASET                        S101

↓

EXECUTE MACHINE LEARNING USING
DATASET AND FEATURE                                 S102

↓

END

Figure 7:
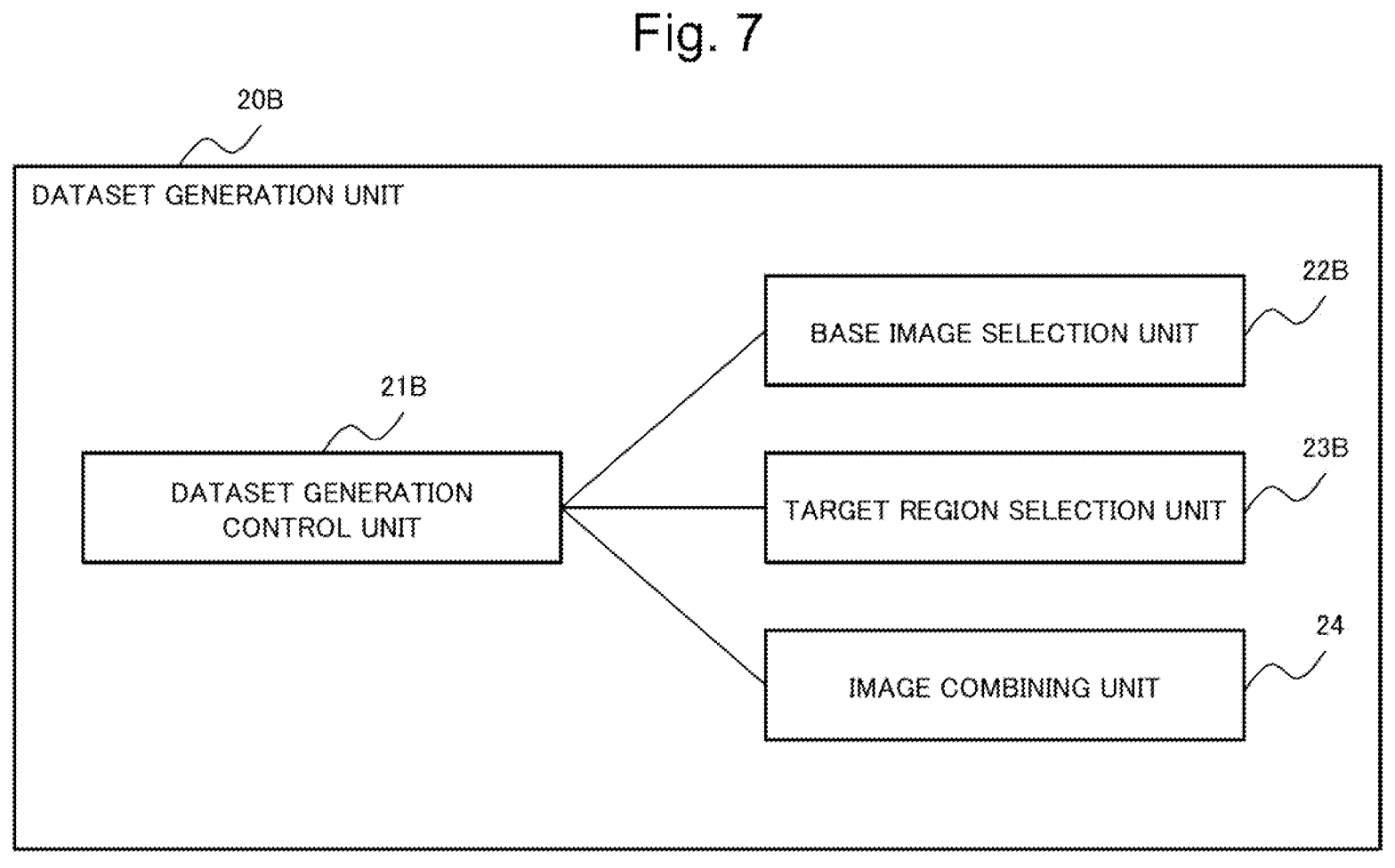

DATASET GENERATION UNIT

22B — BASE IMAGE SELECTION UNIT

23B — TARGET REGION SELECTION UNIT

24 — IMAGE COMBINING UNIT

21B — DATASET GENERATION CONTROL UNIT

Fig. 8

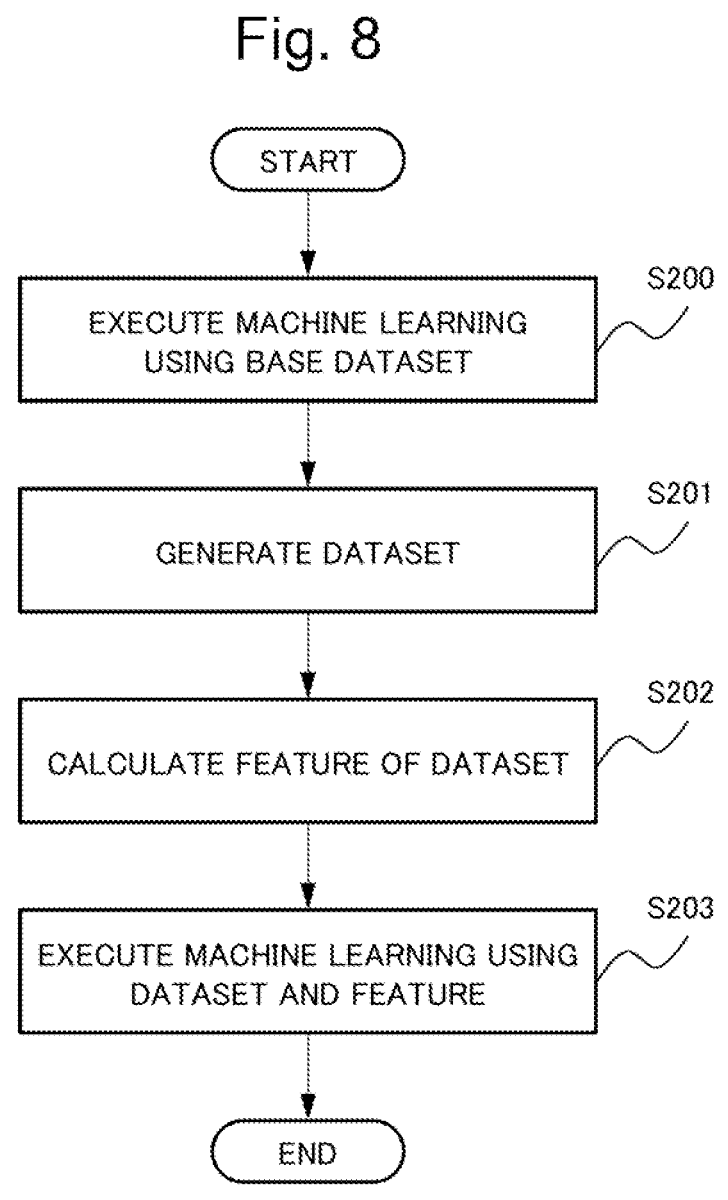

START

S200

EXECUTE MACHINE LEARNING
USING BASE DATASET

S201

GENERATE DATASET

S202

CALCULATE FEATURE OF DATASET

S203

EXECUTE MACHINE LEARNING USING
DATASET AND FEATURE

END

Figure 10:
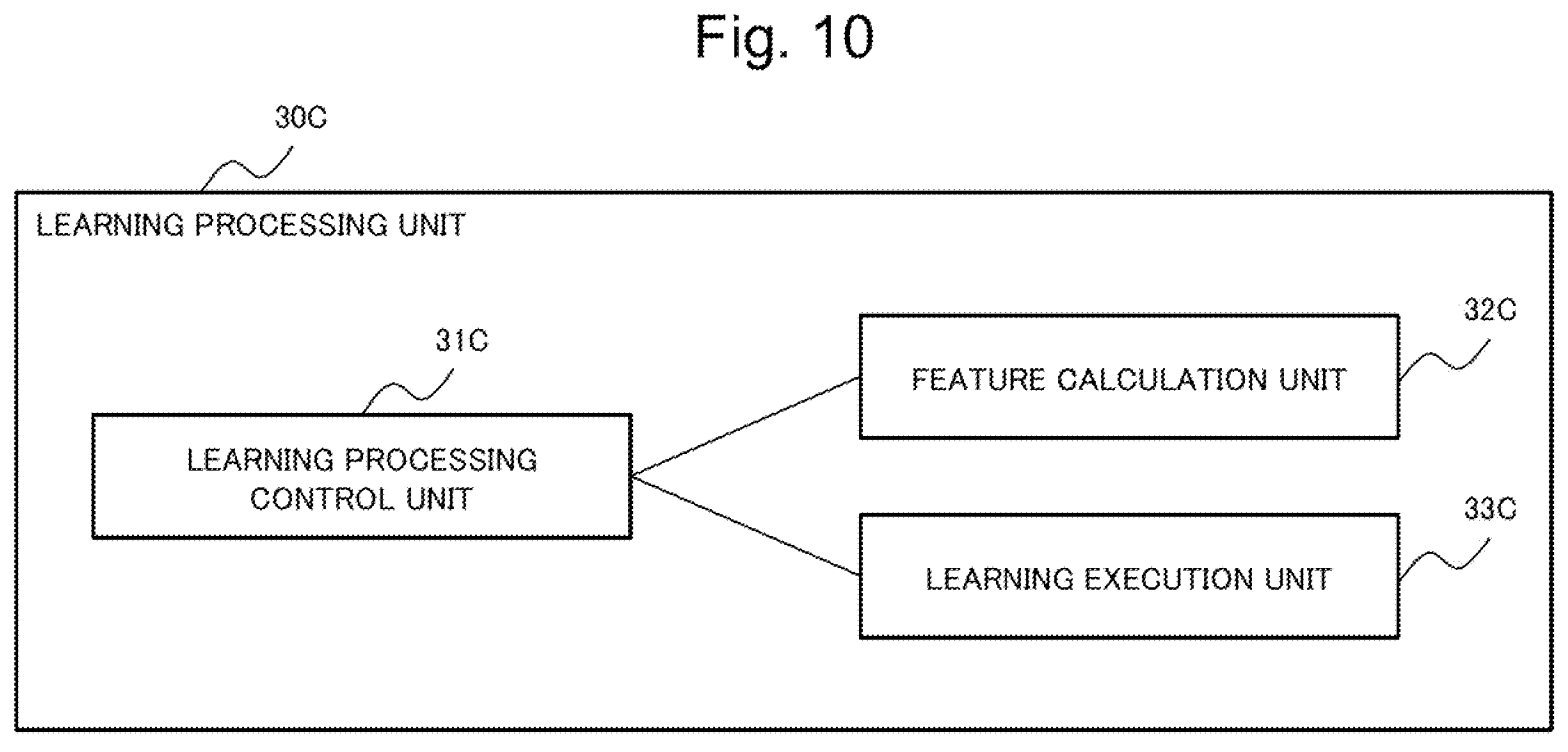

LEARNING PROCESSING UNIT

31C

LEARNING PROCESSING CONTROL UNIT

32C

FEATURE CALCULATION UNIT

33C

LEARNING EXECUTION UNIT

Fig. 13

GENERATED IMAGE

ADDED TARGET REGION

BASE IMAGE

Figure 14:
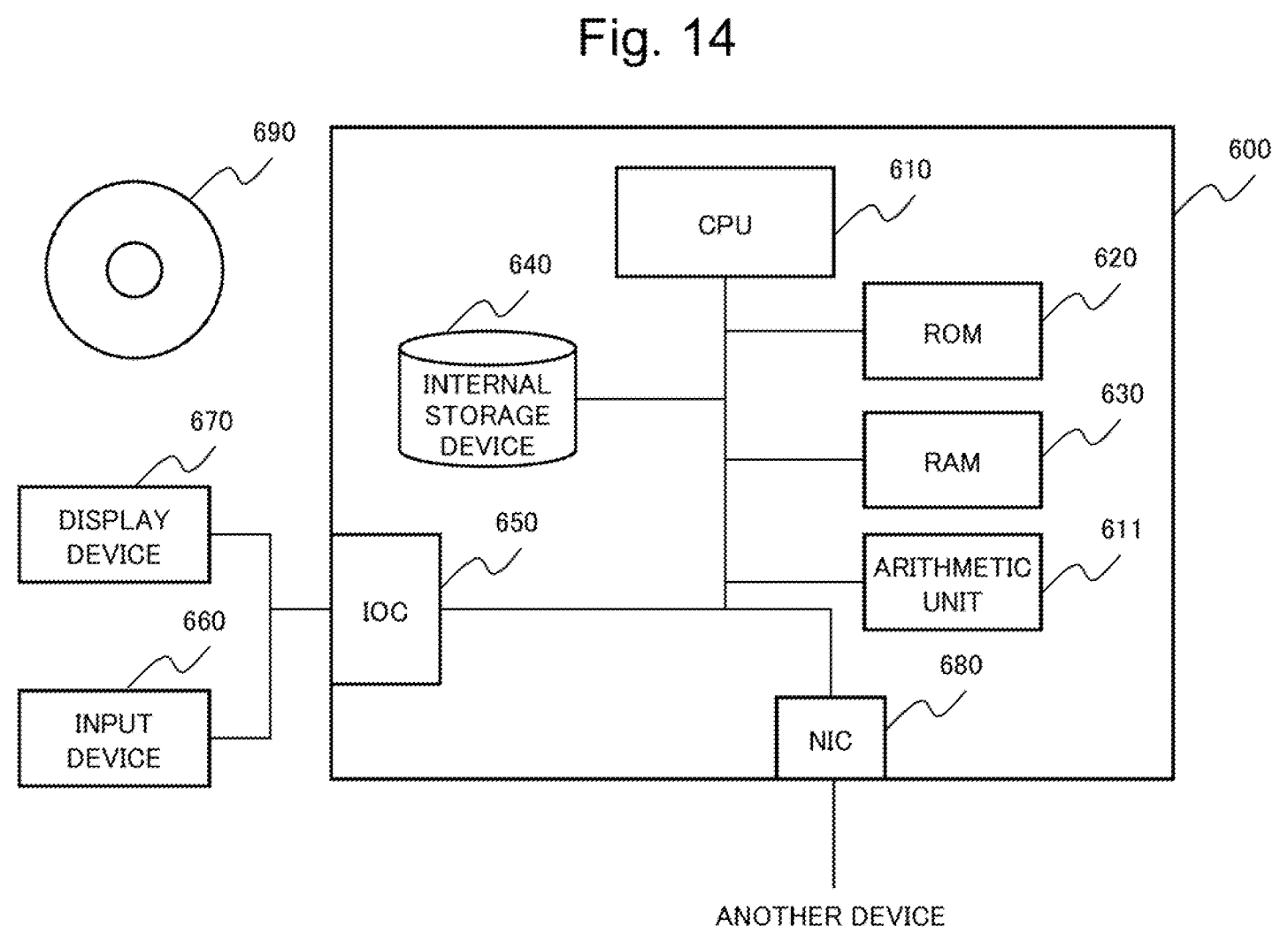

610 CPU

620 ROM

630 RAM

611 ARITHMETIC UNIT

640 INTERNAL STORAGE DEVICE

650 IOC

680 NIC

ANOTHER DEVICE

690

670 DISPLAY DEVICE

660 INPUT DEVICE

INFORMATION PROCESSING DEVICE, INFORMATION PROCESSING METHOD, AND A NON-TRANSITORY COMPUTER READABLE RECORDING MEDIUM INCLUDING SELECTING A BASE IMAGE INCLUDING A TARGET REGION WITH AN OBJECT SUBJECT TO MACHINE LEARNING AND FOR COMBINATION WITH ANOTHER TARGET REGION IN ANOTHER IMAGE TO INCLUDE IN A DATASET FOR TRAINING A MACHINE LEARNING MODEL

This application is a National Stage Entry of PCT/JP2020/028622 filed on Jul. 27, 2020, the contents of all of which are incorporated herein by reference, in their entirety.

TECHNICAL FIELD

The present invention relates to information processing, and particularly to data generation and learning in machine learning.

BACKGROUND ART

Machine learning is used in various detection and prediction processes (see, for example, PTLs 1 and 2).

The learning data generation device described in PTL 1 generates image data obtained by combining image data of a defective portion in a detection target with image data of a non-defective product as data for learning (learning data) used for machine learning.

The feature preparation method described in PTL 2 generates a model for predicting a health need of a patient on the basis of machine learning using similarity between a feature of a model stored in advance and a feature of patient data.

As one of main tasks using machine learning, there is an object detection task using an image. The object detection task is a task of generating a set of a position and a class (type) of a detection target object present in an image.

In the machine learning of the object detection task, an image group for learning and information on a detection target object included in each image are given as correct answer data.

The information on the detection target object is selected according to the specification of the object detection task. For example, the information on the detection target object includes coordinates (bounding box (BB)) of four vertices of a rectangular region in which the detection target object appears and a class (type) of the detection target object. In the following description, the BB and the class are used as an example of the information on the detection target object.

Then, the object detection task generates a learned model as a result of machine learning using the image group for learning and the information on the detection target object.

Then, the object detection task applies the learned model to the image including the detection target object, infers the detection target object in the image, and outputs the BB and the class for each detection target object included in the image. The object detection task may output an evaluation result (for example, confidence (confidence)) of the result of the object detection together with the BB and the class.

For example, a person and vehicle monitoring system can be constructed by inputting the image from a monitoring camera to an object detection task, and using the positions and classes of the person and the vehicle appearing in the image of the monitoring camera detected by the object detection task.

In recent years, in an object detection task, an object detection task using deep learning has been widely used (see, for example, NPLs 1 to 3).

As an example of machine learning using deep learning, an example using a neural network (NN) described in NPL 3 will be briefly described.

FIG. 17 is a block diagram illustrating an outline of an NN in NPL 3.

The NN illustrated in FIG. 17 has the following configuration.

Residual Network (ResNet);

Feature Pyramid Network (FPN);

Class classification layer (Classification); and

Regression layer (Regression).

A combined configuration of ResNet and FPN configures a layer (hereinafter, also referred to as a "feature extraction layer") that extracts a feature using a technique called "fully convolutional network (FCN)".

In addition, the class classification layer and the regression layer constitute a set including one each. The configuration illustrated in FIG. 17 includes a plurality of sets including a class classification layer and a regression layer. The class classification layer and the regression layer each have a network configuration, and thus are indicated as "subnet" in FIG. 17. Furthermore, since BB is used as an example, the regression layer is displayed as "Box Regression" in FIG. 17.

In NPL 3, a processing target image is input to ResNet of a feature extraction layer (FCN). ResNet and FPN cooperate to calculate the feature of the input image.

The calculated feature is input to the class classification layer and the regression layer constituting each set. Each of the class classification layer and the regression layer of each set executes class classification processing and regression processing (position detection processing). Then, the class classification layer and the regression layer output the class and the position (BB) of the detection target object, respectively. However, the class classification layer and the regression layer of each set output the class and the position of each of the objects having different regions and sizes for each set.

FIG. 18 is a flowchart for describing an outline of an operation of machine learning in NPL 3. In actual machine learning, a predetermined device or program executes machine learning processing. That is, the subject of the machine learning operation may be hardware or software. However, in the following description using FIG. 18, for convenience of description, "machine learning" is used as a term indicating a subject of an operation. In an actual operation, an operation described as "machine learning" is executed by hardware (for example, a computer) or software (for example, a virtual machine operating on a computer).

In FIG. 18, machine learning acquires an image group for learning and information on a detection target object in each image as correct answer data. Then, the machine learning repeatedly executes the operation described below until a predetermined end condition is satisfied. In the following description, each cycle in the repeatedly executed processing may be referred to as an "iteration".

The end condition is determined based on predetermined knowledge. For example, the following condition is used as the end condition.

(1) The number of repetitions (the number of iterations) exceeds a predetermined threshold.

(2) Between iterations, an amount of improvement in learning accuracy in a learning result is less than a predetermined threshold.

3

(3) An error (loss) between the learning result and the correct answer data is less than a predetermined threshold.

(4) Between iterations, a decrease amount of an error (loss) between the learning result and correct answer data is less than a predetermined threshold.

First, the machine learning acquires correct answer data (step S901). Then, the machine learning acquires an image for learning and information on a detection target object in each image from the correct answer data. The machine learning may be performed for each image, or a plurality of images may be collectively processed.

Further, machine learning may use the same image in different iterations. That is, the machine learning may use the same image as the learning data a plurality of times. In general, machine learning often uses the same image a plurality of times in a learning phase.

In the machine learning, preprocessing is executed on the acquired image for learning (step S902). The preprocessing is performed to improve the accuracy of the result of the machine learning. Therefore, the preprocessing is determined in accordance with the detection target object, the image used for machine learning, and the machine learning method. For example, the preprocessing is changing the size of the image, enlarging or reducing the image in a predetermined direction, deforming the image, correcting distortion, removing noise, cutting out a part of the image, inverting (lateral and/or vertical), and/or changing the hue.

In the machine learning, the preprocessed image is input to the feature extraction layer. The feature extraction layer extracts a feature in the image (step S903).

The class classification layer and the regression layer execute class classification processing and regression processing, respectively, using the extracted features (step S904). The result of this operation is an inference result of machine learning.

In the machine learning, an inference result (for example, class and BB) is compared with information (for example, the correct class and the correct BB) on a detection target object in an image used for learning, and an error (loss) is calculated (step S905).

In the machine learning, gradients in the class classification layer and the regression layer are calculated on the basis of the loss, and weights of the class classification layer and the regression layer are updated on the basis of the gradients (step S906). The gradient here is a gradient of an evaluation function (for example, a loss function) related to each layer.

Furthermore, in the machine learning, the gradient is also calculated for the feature extraction layer, and the weight in the feature extraction layer is updated on the basis of the gradient (step S907).

The operations in steps S906 and S907 are backpropagation in machine learning. Machine learning uses backpropagation to update the weight of each layer (learn the weight).

The weight update may be executed not in all layers but in some layers.

For example, the weight of the feature extraction layer may not be updated (may not be learned). In this case, the machine learning may not include step S907.

An NN having a weight obtained as a result of such machine learning is a learned model.

4

CITATION LIST

Patent Literature

[PTL 1] JP 2020-027424 A
[PTL 2] JP 2019-185751 A

Non-Patent Literature

[NPL 1] Shaoqing Ren, Kaiming He, Ross Girshick, Jian Sun, "Faster R-CNN: Towards Real-Time Object Detection with Region Proposal Networks", [online], 6 Jan. 2016, Cornel University, [Searched on Oct. 16, 2019], Internet, <URL: https://arxiv.org/abs/1506.01497>
[NPL 2] Wei Liu, Dragomir Anguelov, Dumitru Erhan, Christian Szegedy, Scott Reed, Cheng-Yang Fu, Alexander C. Berg, "SSD: Single Shot MultiBox Detector", [online], 29 Dec. 2016, Cornel University, [Searched on Oct. 16, 2019], Internet, <URL: https://arxiv.org/abs/1512.02325>
[NPL 3] Tsung-Yi Lin, Priya Goyal, Ross Girshick, Kaiming He, Piotr Dollar, "Focal Loss for Dense Object Detection", [online], 2 Feb. 2018, Cornel University, [Searched on Oct. 16, 2019], <URL: https//arxiv.org/abs/1708.02002>

SUMMARY OF INVENTION

Technical Problem

Machine learning in an object detection task generally has a high calculation load and requires a long processing time.

For example, in the machine learning described with reference to FIG. 18, the operations in steps S903, S904, S906, and S907 are operations with a high calculation load.

As a method for reducing the calculation load, there is the following method.

Machine learning using an image often uses the same image a plurality of times in a learning phase. Therefore, a method of storing a calculation result in machine learning of each image and reusing the stored calculation result to reduce a load of calculation processing is used.

Here, it is assumed that the above method is applied in the machine learning described with reference to FIGS. 17 and 18. For example, it is assumed that the above method is applied to the calculation result of the feature extraction layer. Specifically, it is assumed that the feature calculated by the feature extraction layer is reused. That is, when the feature extraction layer calculates the feature for the image, thereafter, the machine learning assumes the operation of using the calculated feature without calculating the feature for the image as the learned image.

In this case, the feature that is the calculation result of the feature extraction layer is a reuse target. In a case where the feature is reused, the machine learning can omit the operation in step S903 for the calculated image. That is, the machine learning can reduce the number of executions in step S903. As a result, the calculation load in the machine learning is reduced.

Machine learning often uses the same image a plurality of times (generally, several tens to several hundreds of times). In a case where the feature for the image is reused, the machine learning can reduce the number of feature calculations (for example, by a factor of several tenths to several hundredths).

However, in FIG. 18, machine learning executes preprocessing of an image before extraction of a feature.

Then, in the generation of the learning data, the preprocessing is not necessarily the same processing in each iteration. The preprocessing is often different in each iteration. Therefore, the images subjected to the preprocessing become different images in each iteration.

As described above, even when the same image is used, the images input to the feature extraction layer are different in each iteration. As a result, the feature calculated by the feature extraction layer differs for each iteration. That is, the machine learning illustrated in FIGS. 17 and 18 cannot reuse the feature extracted by the feature extraction layer.

In a case where the image preprocessing is not performed, the machine learning can reuse the feature extracted by the feature extraction layer.

However, when the image preprocessing is not performed, the accuracy of the learning result may be deteriorated.

In particular, the object detection task is greatly affected by preprocessing in the image.

For example, in the class classification task, the position and orientation of the object to be classified in the image are often known to some extent.

Therefore, in the class classification task, the image preprocessing has a relatively small influence on the accuracy of the result of class classification.

For example, in PTL 1, the position of the defective portion is within the range of a non-defective product (for example, a can). The change in the shape of the defective portion is a combination of rotation and enlargement or reduction.

On the other hand, the object detection task detects the position in addition to the class of the detection target object. In the object detection task, the range of variation of the position and the orientation of the detection target object is widened in many cases. For example, when a vehicle in an image of a road is a detection target object, if an accident, a violation, or the like is assumed, the position and orientation of the vehicle cannot be determined in the image. For example, the vehicle may travel in the wrong direction, jump out of the road, or fall over.

Therefore, in the object detection task, the influence of the preprocessing of the image on the detection accuracy of the detection target object becomes relatively large.

As described above, the object detection task is greatly affected by the preprocessing of the image as compared with the class classification task. That is, in a general object detection task, preprocessing of an image is required in order to ensure accuracy of a learning result.

As described above, since a general object detection task requires preprocessing of an image, it is difficult to reuse a calculation result in a learning result. Therefore, a general object detection task has an issue that it is difficult to reduce a load related to processing (in particular, image preprocessing).

The technique described in PTL 1 combines image data of a defective portion with image data of a non-defective product, and is not a technique related to a load of preprocessing of an image in machine learning.

The technique described in PTL 2 generates a model of machine learning using a feature of a model and a feature of patient data, and is not a technique related to a load of preprocessing in machine learning.

The techniques described in NPLs 1 to 3 are techniques related to learning processing using an image, and are not related to preprocessing of an image.

As described above, the techniques described in PTLs 1 and 2 and NPLs 1 to 3 cannot solve the above issue.

An object of the present invention is to provide an information processing device and the like that solve the above issue and reduce a processing load in machine learning.

Solution to Problem

An information processing device according to an aspect of the present invention includes: a memory; and at least one processor coupled to the memory. The processor performs operations. The operations include: selecting a base image from a base dataset that is a set of images including a target region including an object to be subjected to machine learning and a background region not including an object to be subjected to machine learning, and generating a processing target image that is a copy of the selected base image; selecting the target region included in another image included in the base dataset; combining an image of the selected target region and information on an object to be subjected to machine learning included in the image of the target region with the processing target image; generating a dataset that is a set of the processing target images obtained by combining a predetermined number of the target regions; calculating a feature of an image included in the dataset; generating a learned model using first machine learning that is machine learning using the feature and the dataset; and outputting the generated learned model generated.

An information processing method according to an aspect of the present invention includes: selecting a base image from a base dataset that is a set of images including a target region including an object to be subjected to machine learning and a background region not including an object to be subjected to machine learning, and generating a processing target image that is a copy of the selected base image; selecting the target region included in another image included in the base dataset; combining an image of the selected target region and information on an object to be subjected to machine learning included in the image of the target region with the processing target image; generating a dataset that is a set of the processing target images obtained by combining a predetermined number of the target regions; calculating a feature of an image included in the dataset; generating a learned model using first machine learning that is machine learning using the feature and the dataset; and outputting the generated learned model.

A non-transitory recording medium according to an aspect of the present invention embodies a program. The program causes a computer to perform a method. The method includes: selecting a base image from a base dataset that is a set of images including a target region including an object to be subjected to machine learning and a background region not including an object to be subjected to machine learning, and generating a processing target image that is a copy of the selected base image; selecting the target region included in another image included in the base dataset; combining an image of the selected target region and information on an object to be subjected to machine learning included in the image of the target region with the processing target image; generating a dataset that is a set of the processing target images obtained by combining a predetermined number of the target regions; calculating a feature of an image included in the dataset; generating a learned model using first machine learning that is machine learning using the feature and the dataset; and outputting the generated learned model.

Advantageous Effects of Invention

According to the present invention, it is possible to achieve an effect of reducing a processing load in machine learning.

BRIEF DESCRIPTION OF DRAWINGS

FIG. 1 is a block diagram illustrating an example of a configuration of an information processing device according to a first example embodiment.

FIG. 2 is a block diagram illustrating an example of a configuration of a dataset generation unit according to the first example embodiment.

FIG. 3 is a block diagram illustrating an example of a configuration of a learning processing unit according to the first example embodiment.

FIG. 4 is a flowchart illustrating an example of an operation of machine learning in the information processing device according to the first example embodiment.

FIG. 6 is a block diagram illustrating an example of a configuration of an information processing device according to a second example embodiment.

FIG. 7 is a block diagram illustrating an example of a configuration of a dataset generation unit according to the second example embodiment.

FIG. 8 is a flowchart illustrating an example of an operation of machine learning in the information processing device according to the second example embodiment.

FIG. 10 is a block diagram illustrating an example of a configuration of a learning processing unit according to the third example embodiment.

FIG. 13 is a diagram for explaining an image generated by the dataset generation unit according to the first example embodiment.

FIG. 14 is a block diagram illustrating an example of a hardware configuration of an information processing device.

EXAMPLE EMBODIMENT

Figure 5:
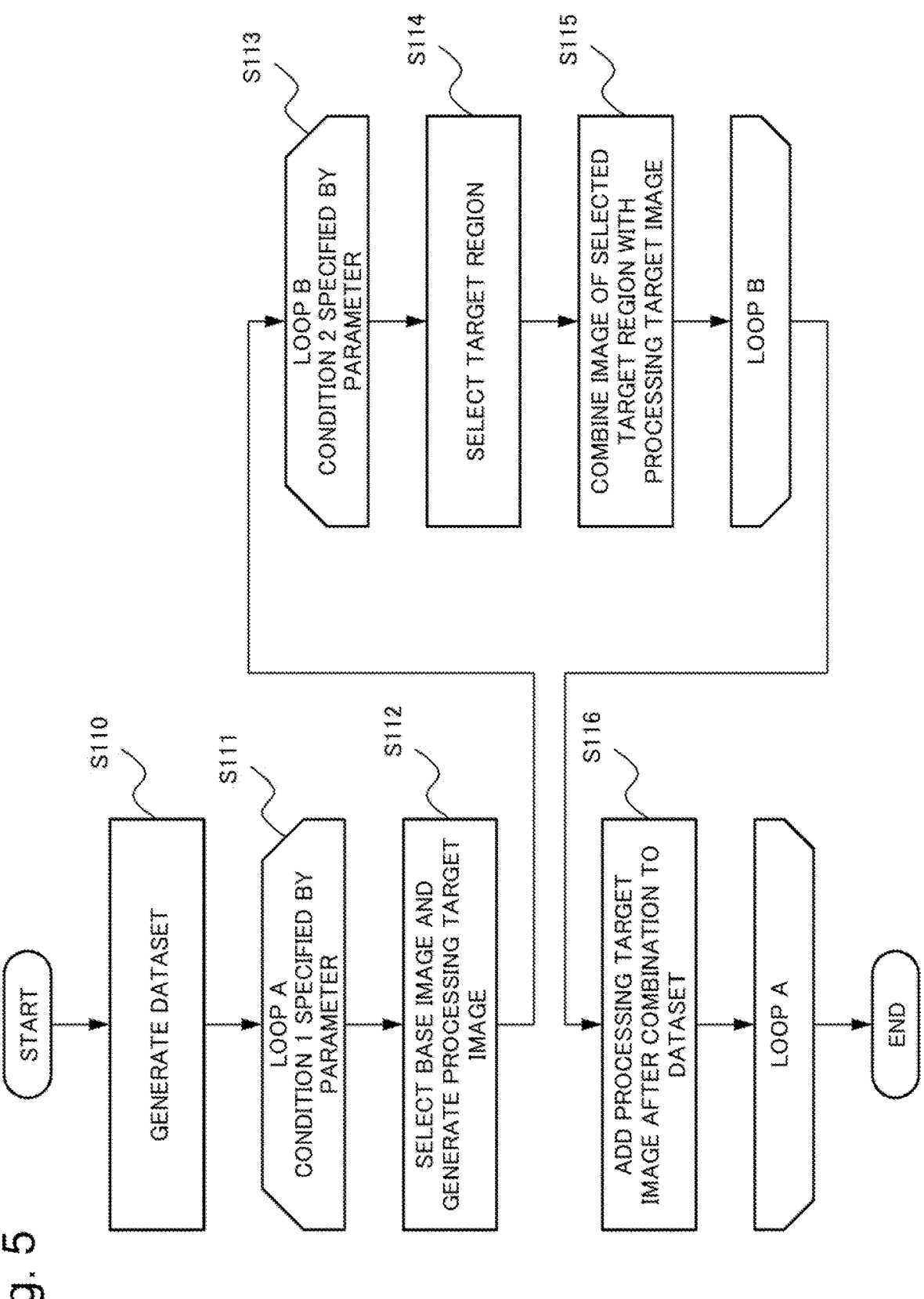
FIG. 5 is a flowchart illustrating an example of an operation of a dataset generation unit in the information processing device according to the first example embodiment.

Hereinafter, an example embodiment of the present invention will be described with reference to the drawings.

Each drawing is for describing an example embodiment. However, the present invention is not limited to the description of each drawing. In addition, similar configurations in the drawings are denoted by the same reference numerals, and repeated description thereof may be omitted. In addition, in the drawings used in the following description, the description of portions not related to the description of the example embodiment may be omitted and not illustrated. In addition, directions of arrows in the drawings illustrate an example, and do not limit directions of signals between blocks.

First Example Embodiment

Hereinafter, a first example embodiment will be described with reference to the drawings.

[Description of Configuration]

First, a configuration of a first example embodiment will be described with reference to the drawings.

Figure 1:
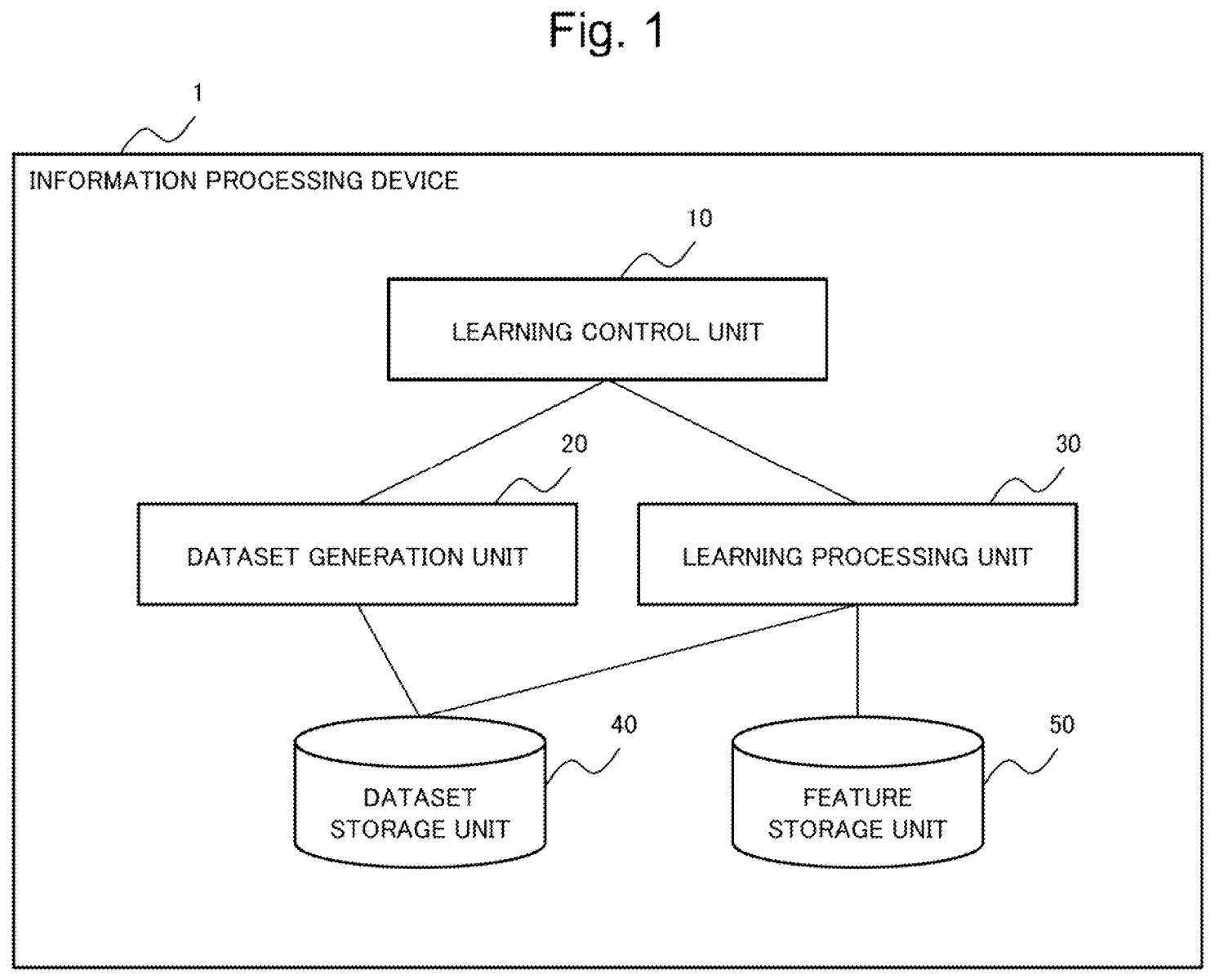

FIG. 1 is a block diagram illustrating an example of a configuration of an information processing device 1 according to a first example embodiment.

The information processing device 1 includes a learning control unit 10, a dataset generation unit 20, a learning processing unit 30, a dataset storage unit 40, and a feature storage unit 50. The number of components and the connection relationship illustrated in FIG. 1 are an example. For example, the information processing device 1 may include a plurality of dataset generation units 20 and/or a plurality of learning processing units 30.

The information processing device 1 may be configured using a computer device including a central processing unit (CPU), a main memory, and a secondary storage device. In this case, the components of the information processing device 1 illustrated in FIG. 1 are components of functions implemented using a CPU or the like. The hardware configuration will be described later.

The learning control unit 10 controls each component in order for the information processing device 1 to execute machine learning (for example, machine learning in an object detection task).

Specifically, the learning control unit 10 instructs the dataset generation unit 20 to generate a dataset used for machine learning. Then, the learning control unit 10 instructs the learning processing unit 30 to execute machine learning using the generated dataset.

Parameters associated with the trigger for starting the control of the learning control unit 10 and the instruction transmitted by the learning control unit 10 to each component are optional. For example, the learning control unit 10 may be given a trigger and a parameter from an operator. Alternatively, the learning control unit 10 may execute control in response to transmission of information such as parameters from another device (not illustrated) communicably connected to the information processing device 1.

The dataset storage unit 40 stores information used by the dataset generation unit 20 and/or the learning processing unit 30 on the basis of the instruction. The dataset storage unit 40 may store the information generated by the dataset generation unit 20 and/or the learning processing unit 30. Furthermore, the dataset storage unit 40 may store parameters.

For example, the dataset storage unit 40 may store the dataset generated by the dataset generation unit 20. Alternatively, the dataset storage unit 40 may store a base dataset (details will be described later) given from the operator of the information processing device 1. Alternatively, the dataset storage unit 40 may store information (for example, a parameter and/or a base dataset) received from another device (not illustrated) communicably connected to the information processing device 1 as necessary.

The dataset storage unit 40 may store information (for example, a dataset for comparison) for evaluating a result of machine learning in addition to storing information (for example, a dataset) used for machine learning.

In the following description, the dataset generation unit 20 generates a dataset using the base dataset stored in the dataset storage unit 40. However, the first example embodiment is not limited thereto.

For example, the dataset generation unit 20 may acquire at least a part of the base dataset from a component different from the dataset storage unit 40 or an external device. Alternatively, the dataset generation unit 20 may acquire information on the detection target object included in the base dataset from an external device (not illustrated).

The base dataset and the information included in the dataset are set in accordance with machine learning in the information processing device 1. The base dataset and the dataset include, for example, the following information.

(1) Image (for example, Joint Photographic Experts Group (JPEG) data).

(2) Meta information of an image (for example, a time stamp, a data size, an image size, and/or color information).

(3) Information on a detection target object (an object to be subjected to machine learning) included in the image.

The information on the detection target object is optional, and includes, for example, the following information.

(3)-1 Position of region (target region) including detection target object: for example, coordinates of four vertexes of a rectangular region (BB) in which an object is reflected.

(3)-2 Class of detection target object (for example, an identifier of a class or a name of a class).

(3)-3 Number of detection target objects for each image.

(4) Correspondences between identifiers and names of classes.

The dataset is data (for example, correct answer data) used for machine learning. Therefore, the dataset generally includes a plurality of images. For example, the dataset includes several thousands to tens of thousands of images.

The image may be compressed data.

Furthermore, the unit of image storage is optional. Each of the images may be stored as a single data file. Alternatively, a plurality of images may be collectively stored in one data file.

Further, the image may be stored and managed using a hierarchical structure such as a directory or a folder. When there is a plurality of base datasets and/or datasets, the base datasets and/or the datasets may also be stored and managed using a hierarchical structure such as a directory or a folder.

The dataset generation unit 20 generates a dataset used for machine learning in the learning processing unit 30 on the basis of data (hereinafter, referred to as a "base dataset") including an image of a detection target object. The dataset generation unit 20 may store the generated dataset in the dataset storage unit 40.

More specifically, the dataset generation unit 20 receives the specification of the base dataset and the parameters related to the generation of the dataset from the learning control unit 10 and generates the dataset.

The base dataset is a set of images including a region (target region) of an image including a detection target object that is a target of machine learning and a region (hereinafter, referred to as a "background region") not including a detection target object that is a target of machine learning.

The dataset generation unit 20 generates a dataset used for machine learning using the following operation on the basis of the base dataset.

(1) The dataset generation unit 20 selects an image (hereinafter, referred to as a "base image") to be a basis (base) in the following processing from the base dataset. The dataset generation unit 20 may select a plurality of base images. Then, the dataset generation unit 20 generates a copy (hereinafter, referred to as a "processing target image") of the selected base image. The dataset generation unit 20 copies the information on the detection target object included in the base image as the information on the detection target object of the processing target image.

(2) The dataset generation unit 20 applies the following operation to the processing target image to combine the target region with the processing target image.

(2)-1 The dataset generation unit 20 selects another image (an image different from the selected base image) included in the base dataset, and selects a region (target region) including a detection target object that is a target of machine learning from the selected other image. In a case where the selected other image includes a plurality of target regions, the dataset generation unit 20 may select one target region or may select a plurality of target regions.

(2)-2 The dataset generation unit 20 combines the image of the selected target region with the processing target image.

(3) The dataset generation unit 20 generates a dataset that is a set of processing target images after combination.

(4) The dataset generation unit 20 transmits the generated dataset to the learning processing unit 30 or stores the generated dataset in the dataset storage unit 40.

The dataset generation unit 20 may deform the target region before combining the target region with the processing target image.

For example, the dataset generation unit 20 may deform the shape (for example, a width, a height, a size, or an aspect ratio (a ratio of a height to a width of an image)) of the target region. Alternatively, the dataset generation unit 20 may apply a deformation (for example, image rotation (change of orientation), image inclination, trapezoidal deformation, barrel-shaped/pincushion-type aberration correction, and/or chromatic aberration correction) other than the above to the target region. Alternatively, the dataset generation unit 20 may execute predetermined image processing (for example, noise removal and/or edge enhancement processing) on the target region.

The dataset generation unit 20 may process the region of the detection target object included in the target region (hereinafter, referred to as "foreground") and the region not including the detection target object (hereinafter, referred to as a "background") separately. For example, the dataset generation unit 20 may cut out the foreground from the target region and combine the cut-out foreground with the processing target image. That is, the dataset generation unit 20 may not combine the background with the processing target image.

The dataset generation unit 20 may execute predetermined processing on the cut-out foreground and combine the processed foreground with the processing target image.

A method of separating the foreground and the background will be described later.

Alternatively, the dataset generation unit 20 may apply processing (for example, the rotation, deformation, and/or correction of color (color tone, brightness, saturation, and the like) to match the combination destination) for conforming to the image of the combination destination to the target region.

Alternatively, the dataset generation unit 20 may deform the target region using deformation that improves the accuracy of the machine learning executed by the learning processing unit 30.

After combining the target image with the processing target image, the dataset generation unit 20 adds information (for example, the BB and the class of the detection target object) on the detection target object in the combined target region to the information on the detection target object of the processing target image. As described above, the dataset generated by the dataset generation unit 20 includes information on the detection target object added to the processing target image.

Using such an operation, the dataset generation unit 20 generates a dataset so that an effect corresponding to an effect (improvement in accuracy of machine learning) obtained in preprocessing in general machine learning is obtained.

Therefore, the learning processing unit 30 can accurately execute the calculation processing, the classification processing, and the regression processing of the feature of the image included in the dataset using the information on the detection target object, without executing the preprocessing on the image.

In a case where the predetermined processing is executed on the target region, the dataset generation unit 20 adds the information on the detection target object reflecting the result of the processing to the information on the detection target object of the processing target image.

Details of the operation in the dataset generation unit 20 will be described later.

The learning processing unit 30 executes machine learning using the following operation using the dataset generated by the dataset generation unit 20.

(1) The learning processing unit 30 calculates a feature for each image included in the dataset (for example, the dataset stored in the dataset storage unit 40) generated by the dataset generation unit 20. The learning processing unit 30 stores the calculated feature in the feature storage unit 50 in association with the image of the dataset. The learning processing unit 30 may execute predetermined processing (for example, compression processing) on the feature before storing the feature in the feature storage unit 50.

(2) The learning processing unit 30 executes machine learning of the dataset generated by the dataset generation unit 20 using the calculated feature and generates a learned model (for example, an object detection model).

As described above, the learning processing unit 30 calculates the feature for each image included in the dataset prior to the execution of the actual learning processing. Then, the learning processing unit 30 executes machine learning using the calculated feature and the dataset.

The feature used by the information processing device 1 is optional. For example, the information processing device 1 may use a feature calculated using a convolutional neural network (CNN). Alternatively, as another example, the information processing device 1 may use "Histograms of Oriented Graduients (HOG) feature" or "Scale-Invariant Feature Transform (SIFT) feature".

Details of the operation in the learning processing unit 30 will be described later.

The learning processing unit 30 may use deep learning as machine learning.

Furthermore, the learning processing unit 30 may evaluate a result of machine learning. For example, the learning processing unit 30 may calculate the recognition accuracy of the detection target object in the result of the machine learning.

Then, the learning processing unit 30 stores the generated learned model in a predetermined storage unit (for example, the dataset storage unit 40). Alternatively, the learning processing unit 30 transmits the generated learned model to a predetermined device (for example, a device that detects a detection target object in an image using a learned model).

The feature storage unit 50 stores the feature calculated by the learning processing unit 30, that is, the feature of the image included in the dataset, on the basis of an instruction.

The feature storage unit 50 may store information on the feature in addition to the feature. For example, the feature storage unit 50 may store, as the information on the feature, information on the image for which the feature has been calculated and/or information on a dataset including the image for which the feature has been calculated.

Alternatively, the feature storage unit 50 may store information on processing (for example, a layer of NN) of calculating the feature.

The dataset storage unit 40 may store the feature of the image included in the dataset. That is, the dataset storage unit 40 may include the function of the feature storage unit 50. In this case, the information processing device 1 may not include the feature storage unit 50 as a physical configuration.

Next, a configuration of the dataset generation unit 20 according to the first example embodiment will be described with reference to the drawings.

FIG. 2 is a block diagram illustrating an example of a configuration of the dataset generation unit 20 according to the first example embodiment.

The dataset generation unit 20 includes a dataset generation-control unit 21, a base-image selection unit 22, a target-region selection unit 23, and an image combining unit 24.

The dataset generation-control unit 21 controls each component included in the dataset generation unit 20, generates a predetermined number of processing target images from the base dataset, and generates a dataset that is a set of the generated processing target images.

For example, the dataset generation-control unit 21 receives a base dataset and parameters related to generation of a dataset from the learning control unit 10, controls each unit in the dataset generation unit 20, and generates a dataset.

The parameter is determined in accordance with the dataset to be generated. For example, the dataset generation-control unit 21 may use the following information as parameters related to the generation of the dataset.

(1) The number of processing target images to be generated (the number of images included in the dataset to be generated).

(2) Maximum number of target regions to be combined.

(3) Information related to deformation of the target region to be combined.

The information on the deformation may be set according to the deformation to be applied. The information on the deformation is, for example, information indicating whether the target region is to be deformed, and a value related to the deformation when the target region is to be deformed.

The value related to deformation may be a value indicating a range instead of an individual value. For example, when the dataset generation-control unit 21 deforms the target region using a random number, the value related to the deformation may be a seed of the random number and a range of the random number value (for example, a value generated by a random number generating function (or module) using the seed of a random number). A fixed value or a standard value (default value) of a configuration (for example, the random number generation module) for generating the random number may be used as the seed of the random number. In this case, the dataset generation-control unit 21 may use the range of the random number value as the value related to the deformation.

Examples of the range of the random number value related to the deformation of the target region include the following ranges.

(1) The range of the random number value by which the width is multiplied when the width of the target region is changed.

(2) The range of the random number value by which the height is multiplied when the height of the target region is changed.

(3) The range of the random number value by which the size is multiplied when the size of the target region is changed.

(4) The range of the random number value used as the aspect ratio after change when the aspect ratio of the target region is changed.

(5) The range of the random number value used as the rotation angle when the target region is rotated.

(6) The range of the random number value used as the angle of the inclination when the target region is inclined.

Furthermore, the dataset generation-control unit 21 may use the following information as the information on the deformation of the target region.

(1) Information indicating whether to laterally invert the target region when combining target regions.

(2) Information indicating whether to vertically invert the target region when combining the target region.

The dataset generation-control unit 21 may perform control such that the lateral and/or vertical inversion of the target region is not fixed but is randomly executed. For example, the dataset generation-control unit 21 may acquire a random number value from a configuration (not illustrated), and perform control so that inversion is executed when the acquired random number value exceeds a predetermined threshold value and inversion is not executed when the acquired random number value is equal to or less than the threshold value.

Furthermore, the dataset generation-control unit 21 may use information indicating whether to use the foreground of the target region or to use the entire target region.

A setting range of the maximum number of target regions is optional. For example, the maximum number is a maximum number for each dataset, a maximum number for each subset described below, a maximum number for each image, a maximum number for each class, or a maximum number for each image size.

In the generation of the dataset, the dataset generation-control unit 21 may use the value received as a parameter as the maximum number of target regions to be combined.

However, the dataset generation-control unit 21 may receive a value for calculating the maximum value as a parameter. For example, the dataset generation-control unit 21 may use a random number value with the value of the received parameter as a seed as the maximum value.

The dataset generation-control unit 21 may calculate the maximum value using the random number value for each processing target image.

The dataset generation-control unit 21 may receive, as the parameter, a parameter that specifies whether to use the received parameter as a maximum value or a value for calculating the maximum value.

The base-image selection unit 22 selects a base image from the base dataset and generates a processing target image that is a copy of the base image. The base-image selection unit 22 copies the information on the detection target object included in the base image to the information on the detection target object of the processing target image.

The base-image selection unit 22 may execute predetermined processing before selecting the base image.

For example, the base-image selection unit 22 may divide the image included in the base dataset into a plurality of image groups (hereinafter, referred to as "subsets") on the basis of a predetermined criterion (for example, the similarity of the background region).

The similarity determination method of the background region in the base-image selection unit 22 may be selected according to the target image.

The base-image selection unit 22 may determine the similarity of the background region using, for example, the following information or a combination of pieces of information.

(1) Specification of the operator of the information processing device 1 (the specified images are considered to have similar backgrounds).

(2) Information set in the image of the base dataset (for example, images captured at the same position are considered to have similar backgrounds).

(3) Logical location where the image is stored (for example, images stored in the same directory are considered to have similar backgrounds).

(4) Image acquisition information (for example, images with close time stamps are considered to have similar backgrounds).

(5) Difference in pixel values (for example, pixel values between images are compared, and images having a difference equal to or less than a predetermined threshold are considered to have similar backgrounds).

(6) Similarity of background portion (for example, the background region in the image is extracted, and the images in which the similarity in the features of the images of the extracted background region is equal to or greater than a predetermined threshold are considered to have similar backgrounds).

The base-image selection unit 22 may select a range of a background region to be compared using predetermined information (for example, a distance from the target region or an object included in the background region). However, the base-image selection unit 22 may use all the regions other than the target region as the background region.

Figure 12:
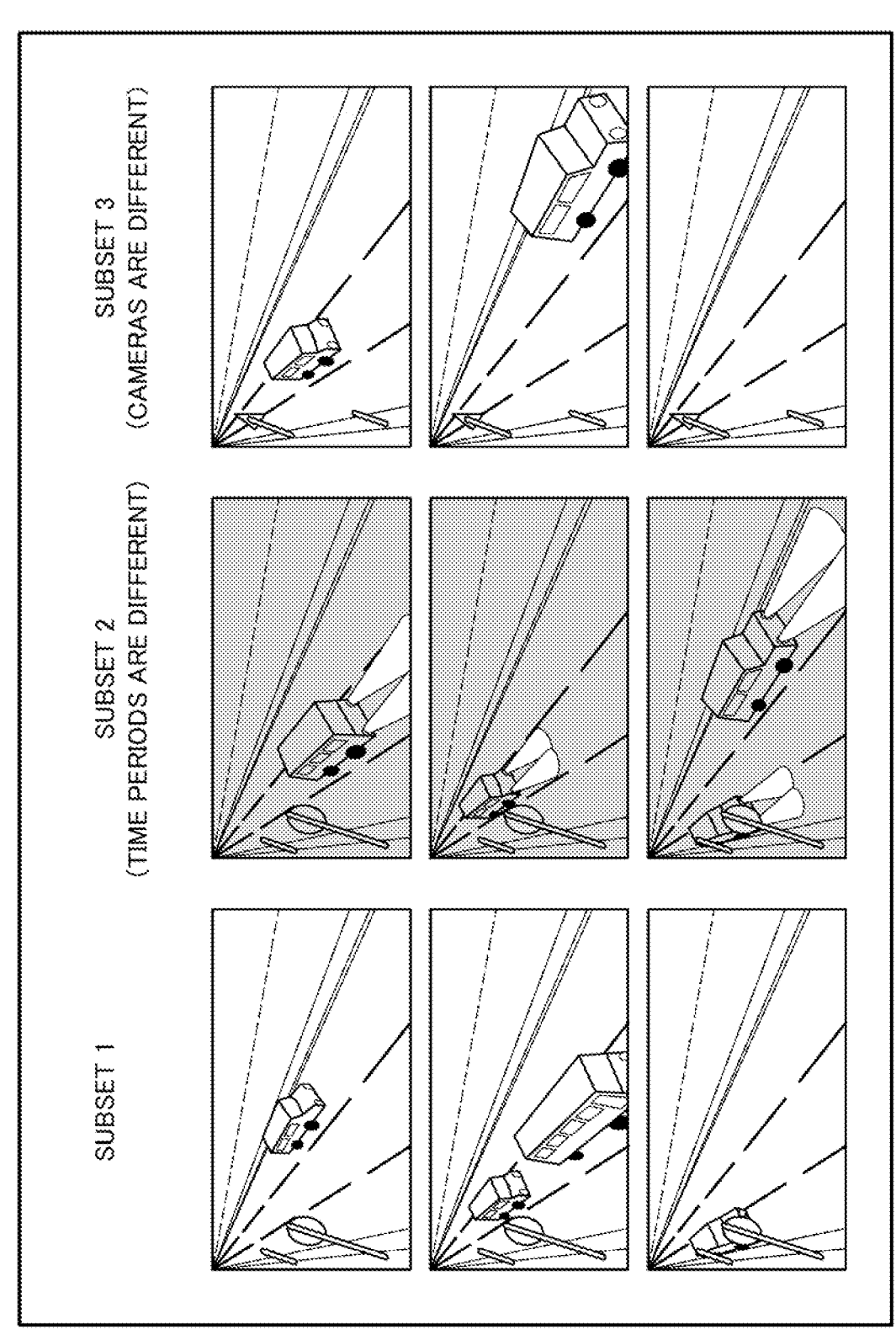
FIG. 12 is a view illustrating an example of a subset.

FIG. 12 is a diagram illustrating an example of a subset.

The subset illustrated in FIG. 12 includes nine images. The image illustrated in FIG. 12 is then divided into three subsets.

Subset 1 and subset 2 are images captured by the same camera. However, the image included in subset 1 is different from the image included in subset 2 in the captured time period. As a result, the background of the image included in subset 1 is different from the background of the image included in subset 2. Therefore, the image included in subset 1 is a different subset from the image included in subset 2.

The image included in subset 3 is an image captured by a camera different from the camera that captured subsets 1 and 2. The background of the image included in subset 3 is different from the background of the image included in subsets 1 and 2. Therefore, the image included in subset 3 is divided into subsets different from the images included in subset 1 and subset 2.

The number of subsets is optional. The number of subsets may be two or four or more.

The base-image selection unit 22 may randomly select the base image. Alternatively, the base-image selection unit 22 may use a predetermined criterion in the selection of the base image. However, the criterion used by the base-image selection unit 22 is optional. For example, the base-image selection unit 22 may select the base image using one of the following criteria or a combination of the criteria.

(1) Number of Images in Subset

The base-image selection unit 22 may select the base image such that the number of images selected from each subset falls within the same number or a range of a predetermined difference.

For example, the base-image selection unit 22 allocates a value obtained by dividing the number of base images to be selected by the number of subsets to each subset as the number of images to be selected from the subset. In a case where the number cannot be divided by an integer, the base-image selection unit 22 may round the divided value to an appropriate integer and allocate the rounded value to the subset such that the total number becomes the number of base images to be selected.

Then, in the selection of the base image, the base-image selection unit 22 selects a number of images corresponding to the number of values allocated to the subset from among the subsets. The base-image selection unit 22 selects an image in the subset according to a predetermined rule (for example, round robin or random).

The number of images selected from the subset may be specified by the operator of the information processing device 1. Alternatively, the number of images selected from the subset may be a value proportional to the number of images included in the subset.

(2) Distribution of Base Image

The base-image selection unit 22 may select the base images so that the base images to be used are distributed. For example, the base-image selection unit 22 may store the history of the selected base image, and select the base image so as not to select the base image (the base image selected in the past) stored in the history.

However, the base-image selection unit 22 may select the base image such that other pieces of information (for example, a time period or a place) are distributed.

(3) Number of Target Regions

The base-image selection unit 22 may select an image including many target regions as the base image.

Alternatively, the base-image selection unit 22 may preferentially select an image including many target regions including an object of a predetermined class.

The predetermined class is, for example, as follows.

(a) The class specified by the operator.

(b) A class with low frequency of appearance in the base dataset or the dataset being generated.

(4) Type of Target Region

The base-image selection unit 22 may select the base image so that the number of types (for example, a class, a size, and/or an image quality of the included detection target object) of target regions included in the image increases.

For example, when there are many images with a few background regions, it is assumed that the images contain many target regions. In addition, when there are many target regions, the number of types of target regions is also large in many cases. Therefore, the base-image selection unit 22 may select the base image so that there are many images with a few background regions.

Then, the base-image selection unit 22 generates a copy (processing target image) of the selected base image. The base-image selection unit 22 copies the information on the detection target object included in the base image as the information on the detection target object of the processing target image.

The target-region selection unit 23 selects a target region to be combined with the processing target image. More specifically, the target-region selection unit 23 selects an image different from the base image of the copy source of the processing target image in the base dataset, and selects a target region to be combined with the background region of the processing target image in the selected image.

The target-region selection unit 23 selects a target region according to a preset rule. The target-region selection unit 23 selects a target region using, for example, any one of the following selections or a combination of selections.

(1) The target-region selection unit 23 selects a target region that falls within the background portion of the processing target image being generated.

(2) The target-region selection unit 23 selects a target region from other images included in the same subset as the base image.

(3) The target-region selection unit 23 selects the target region such that the number of times of selecting the class of the detection target object is uniform within a possible range.

(4) The target-region selection unit 23 selects the target regions such that the number of times of selection of each target region is equal within a possible range.

(5) The target-region selection unit 23 preferentially selects a target region including a detection target object of a predetermined class. For example, the target-region selection unit 23 may preferentially select a target region including a detection target object included in a class related to a detection target object appropriate as a target of machine learning in the learning processing unit 30. The predetermined class is optional, but may be, for example, the following class.

(a) A class specified by an operator of the information processing device 1.

(b) A class with low frequency of appearance in the base dataset or the dataset being generated.

(6) The target-region selection unit 23 preferentially selects a target region having a predetermined size. For example, the target-region selection unit 23 may select a target region having a size effective in machine learning in the learning processing unit 30. The predetermined size is optional, but may be, for example, the following size.

(a) The size specified by the operator of the information processing device 1.

(b) The size with low frequency of appearance in the base dataset or the dataset being generated.

(7) The target-region selection unit 23 may preferentially select a target region having a shape (for example, an aspect ratio of a rectangle) effective for machine learning.

The target-region selection unit 23 may change the shape of the selected target region.

The process of changing the shape of the target region is optional. For example, the target-region selection unit 23 may use any one of the following shape changes or a combination thereof (1) The width of the target region is a width obtained by multiplying the original width by a random number value.

(2) The height of the target region is a height obtained by multiplying the original height by a random number value.

(3) The size of the target region is set to a size obtained by multiplying the original size by a random number value.

(4) The aspect ratio of the target region is an aspect ratio obtained by multiplying the original aspect ratio by a random number value.

(5) The target region is rotated by an angle of a random number value.

(6) The target region is inclined by the angle of the random number value (for example, trapezoidal deformation).

The target-region selection unit 23 may receive the random number value in the above processing as a parameter, or may acquire the random number value from a configuration (not illustrated) (for example, a random number generation module (not illustrated)). Furthermore, the target-region selection unit 23 may acquire a random number value for each selection of the target region, and may use the same random number value for at least some or all of the target regions.

The target-region selection unit 23 may select the target region on the basis of processing on the target region in the image combining unit 24. For example, when the target region is enlarged in combination, the target-region selection unit 23 may select a target region having an expandable size.

Processing of the target region in the image combining unit 24 will be described later.

The image combining unit 24 combines the target region selected by the target-region selection unit 23 with the processing target image.

The image combining unit 24 may combine the target region at the same position as the position in the base image including the target region, or may combine the target region at a position different from the position in the base image, as the position at which the target region is combined with the processing target image.

A combination method used by the image combining unit 24 is optional.

For example, the image combining unit 24 may replace (overwrite) the image of the related region of the processing target image with the image of the selected target region.

Alternatively, the image combining unit 24 may apply a pixel value (for example, an average value) calculated using the pixel value of the processing target image and the pixel value of the image of the target region to the processing target image.

Furthermore, the image combining unit 24 may execute predetermined image processing in image combination. An example of the predetermined image processing is correction (blurring and/or smoothing) of pixels at a boundary of a region where images are combined and in the vicinity thereof.

The image combining unit 24 rather than the target-region selection unit 23 may apply predetermined processing to the target region before the combination.

For example, the image combining unit 24 may enlarge or reduce the processing target image as predetermined processing.

Alternatively, the image combining unit 24 may apply lateral and vertical inversion to the target region as predetermined processing. The image combining unit 24 may randomly execute application of inversion. For example, the image combining unit 24 may generate a random number value between 0 to 1, and may not apply inversion when the generated value is less than 0.5, and may apply inversion when the generated value is equal to or more than 0.5.

Furthermore, the image combining unit 24 may separate the foreground (detection target object) and the background in the target region and combine the foreground with the processing target image.

The method of combining the foreground is particularly effective when the size or position of the target region to be combined with the processing target image is different from the size or position in the base image including the target region.

A method of separating the foreground and the background used by the image combining unit 24 is optional. For example, the image combining unit 24 may use the following method.

First, the image combining unit 24 compares the pixel value of the image of the target region with the pixel value of the image (that is, the image serving as the background after the combination) at the position where the target region is combined in the processing target image. In a case where the image processing is applied to the target region, the image combining unit 24 uses the pixel value of the image of the target region to which the image processing has been applied, as the pixel value of the image of the target region.

Then, the image combining unit 24 sets a pixel having a pixel value difference equal to or less than a predetermined threshold as a background, and sets a pixel having a pixel value difference exceeding a predetermined threshold as a foreground.

The predetermined threshold used for the above comparison is optional. For example, the image combining unit 24 may specify a threshold value from the operator of the information processing device 1.

Furthermore, the threshold used for comparison may be different at a position (for example, when the outer shape of the target region is a polygon, a portion in the vicinity of a corner portion (end portion of a side), a portion in the vicinity of a side (central portion of a side), and a central portion) in the target region.

The image combining unit 24 may use an image different from the processing target image as an image to be compared with the target region. For example, the image combining unit 24 may use an image specified by the operator as a comparison image for separating the foreground and the background.

The image combining unit 24 may use comparison of pixel values in a plurality of pixels in comparison of pixel values. For example, the image combining unit 24 may use, as the pixel value for comparison, an average value of the value of the pixel to be compared and the values of the eight pixels surrounding the pixel.

Figure 13:
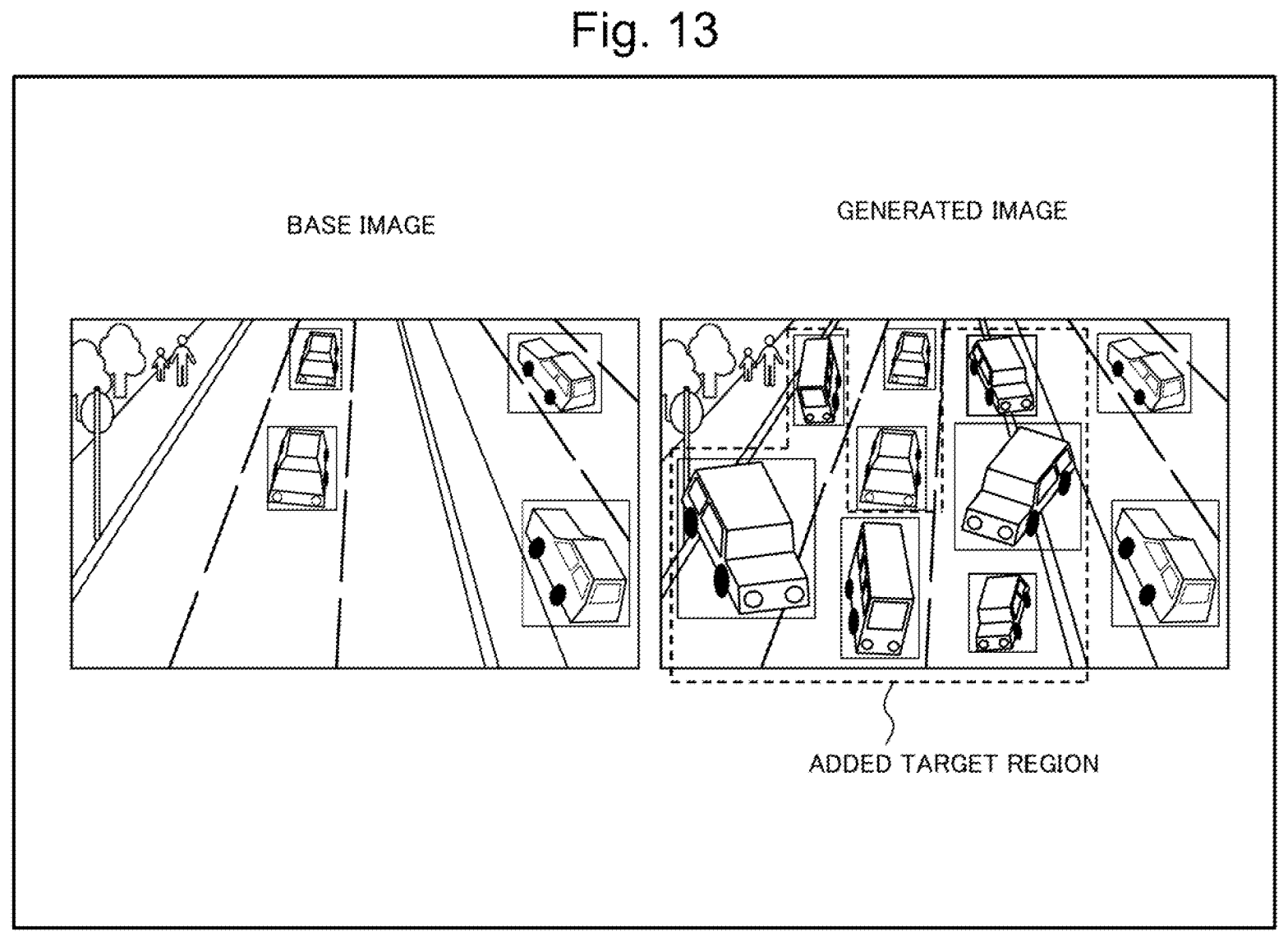

FIG. 13 is a diagram for describing an image generated by the dataset generation unit 20 according to the first example embodiment. In FIG. 13, the target region is surrounded by a rectangle to assist understanding. However, this is for convenience of description. The image generated by the dataset generation unit 20 may not include the rectangle surrounding the target region.

An image on the left side of FIG. 13 is an example of the base image (initial state of the processing target image). The image on the right side of FIG. 13 is an example of the image combined by the image combining unit 24 (processing target image after combining the target region).

The image combining unit 24 may not secure the consistency of the processing target image as a whole in the processing target image after combining the target regions.

For example, in the image on the right side of FIG. 13, the orientation and size of the vehicle that is the detection target object in the added target region are not necessarily consistent. Furthermore, at least a part of the vehicle in the added target region has an unnatural orientation with respect to the road of the processing target image (base image in FIG. 13).

However, these inconsistencies do not significantly affect the result of the machine learning in the learning processing unit 30. This is because the learning processing unit 30 executes the machine learning using the information (for example, BB and class) on the detection target object included in the dataset.

Next, a configuration of the learning processing unit 30 according to the first example embodiment will be described with reference to the drawings.

FIG. 3 is a block diagram illustrating an example of a configuration of the learning processing unit 30 according to the first example embodiment.

The learning processing unit 30 includes a learning-processing control unit 31, a feature calculation unit 32, and a learning execution unit 33.

The learning-processing control unit 31 controls each component included in the learning processing unit 30 on the basis of an instruction from the learning control unit 10 to execute machine learning using the dataset. More specifically, the learning-processing control unit 31 controls the calculation of the feature regarding each image included in the dataset in the feature calculation unit 32 and the execution of the machine learning using the feature and the dataset in the learning execution unit 33.

The feature calculation unit 32 calculates a feature regarding each image included in the dataset. Then, the feature calculation unit 32 stores the calculated feature in the feature storage unit 50.

The dataset generated by the dataset generation unit 20 includes information on the detection target object included in the processing target image. Therefore, the feature calculation unit 32 can accurately calculate the feature in each image included in the dataset using the information on the detection target object without executing the preprocessing on the image. That is, the feature calculation unit 32 does not need image preprocessing.

The feature calculated by the feature calculation unit 32 is determined in accordance with the machine learning executed by the learning execution unit 33. Furthermore, the method of calculating the feature used by the feature calculation unit 32 may be selected in accordance with the feature. For example, when the learning execution unit 33 uses an NN having a configuration as illustrated in FIG. 17, the feature calculation unit 32 may calculate the feature regarding each image included in the dataset using the feature extraction layer in the NN.

Figure 17:
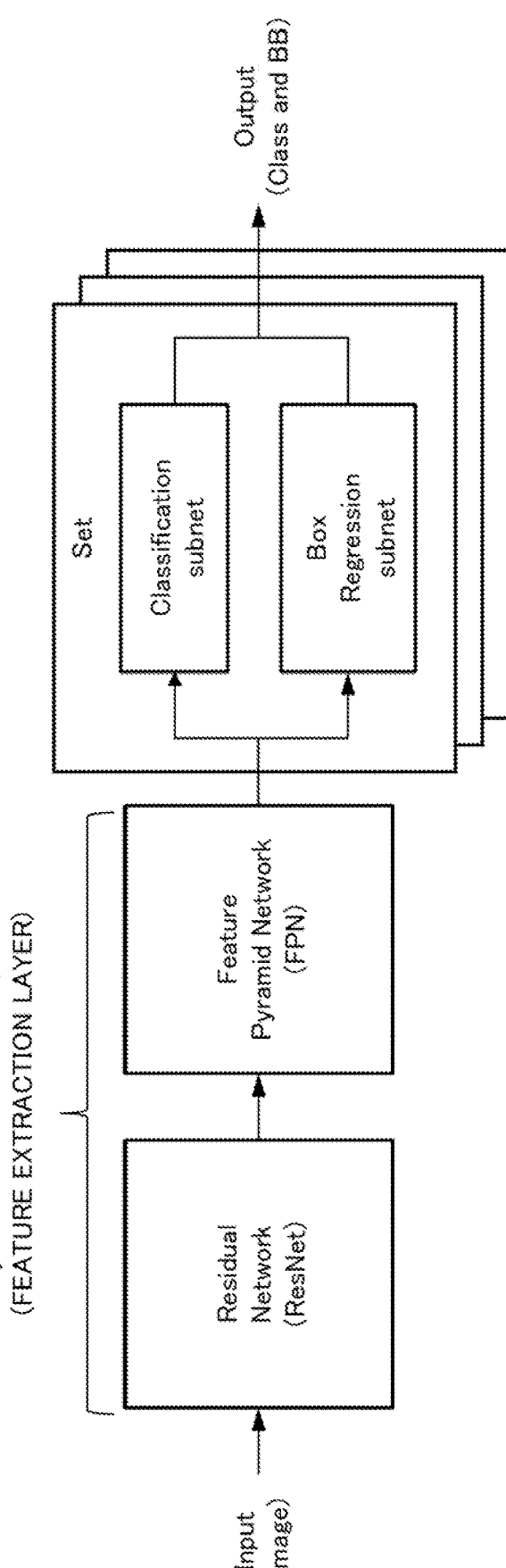
FIG. 17 is a block diagram illustrating an outline of a neural network (NN) in NPL 3.

In a case where the feature extraction layer of the NN as illustrated in FIG. 17 is used, the feature calculation unit 32 may not execute preprocessing of the image before inputting the image to the feature extraction layer.

The learning execution unit 33 executes predetermined machine learning (for example, deep learning in the object detection task) using the dataset.

However, the learning execution unit 33 executes predetermined machine learning using the feature calculated by the feature calculation unit 32.

Figure 18:
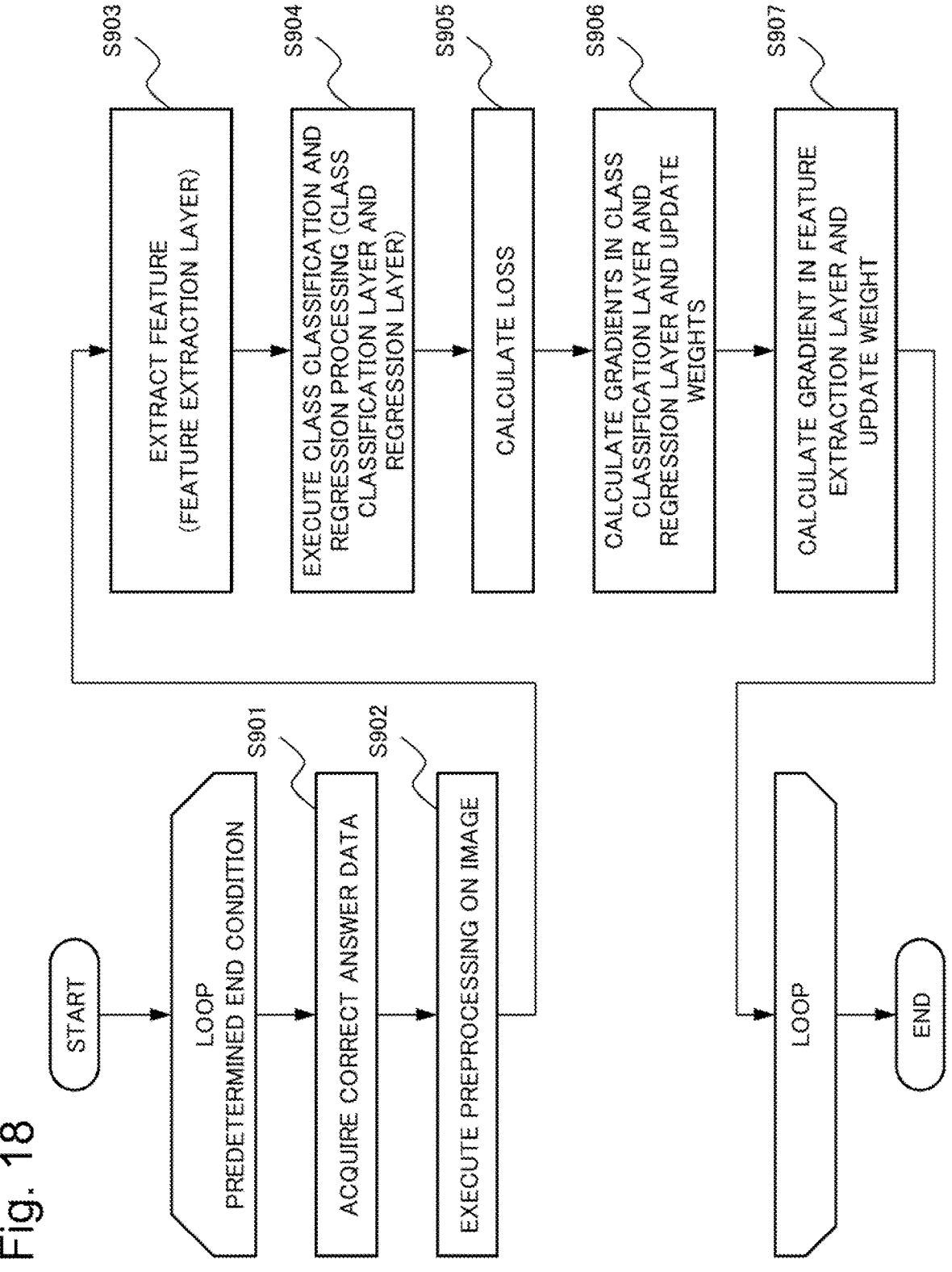
FIG. 18 is a flowchart for explaining an outline of an operation of machine learning in NPL 3.

A typical object detection task performs image preprocessing prior to machine learning. For example, the machine learning illustrated in FIGS. 17 and 18 reads an image from a dataset and applies preprocessing to the read image. Then, the feature extraction layer calculates the feature using the image to which the preprocessing is applied. Then, the class classification layer and the regression layer execute class classification processing and regression processing using the calculated feature.

On the other hand, the learning execution unit 33 executes machine learning using the feature (for example, the feature stored in the feature storage unit 50) calculated by the feature calculation unit 32. That is, the learning execution unit 33 can execute the machine learning without calculating the feature from the image when executing the machine learning. Therefore, the learning execution unit 33 does not need image preprocessing in machine learning.

As described above, the learning execution unit 33 may execute learning (for example, updating the weight) of some layers instead of all layers. For example, when the learning execution unit 33 uses a configuration similar to that of the NN illustrated in FIG. 17, the learning execution unit 33 may update the weights of the class classification layer and the regression layer and may not update the weight of the feature extraction layer.

[Description of Operation]

Next, an example of an operation in the information processing device 1 according to the first example embodiment will be described with reference to the drawings.

(A) Operation of Machine Learning

FIG. 4 is a flowchart illustrating an example of an operation of machine learning in the information processing device 1 according to the first example embodiment.

The information processing device 1 starts operation when a predetermined condition is satisfied. For example, the information processing device 1 starts machine learning in response to an instruction from an operator of the information processing device 1. In this case, at the start of the machine learning, the information processing device 1 may receive parameters necessary for the machine learning from the operator. The information processing device 1 may receive other parameters and information in addition to the parameters necessary for machine learning. For example, the information processing device 1 may receive the base dataset from the operator, or may receive parameters related to generation of the dataset.

The learning control unit 10 instructs the dataset generation unit 20 to generate a dataset. The dataset generation unit 20 generates a dataset (step S100). The dataset generation unit 20 may receive a parameter for generating the dataset.

The learning control unit 10 instructs the learning processing unit 30 to calculate the feature for each image of the dataset generated by the dataset generation unit 20. The learning processing unit 30 calculates a feature for each image of the dataset (step S101). Then, the learning processing unit 30 stores the calculated feature in the feature storage unit 50. The learning processing unit 30 may receive a parameter used for calculation of the feature.

The learning control unit 10 further instructs the learning processing unit 30 to perform machine learning using the dataset and the feature. The learning processing unit 30 executes machine learning using the dataset generated by the dataset generation unit 20 and the feature calculated by the learning processing unit 30 (step S102). The learning processing unit 30 may receive parameters used for machine learning.

When the machine learning in the learning processing unit 30 ends, the information processing device 1 ends the operation.

The learning processing unit 30 may transmit a learned model that is a result of learning to a predetermined device or may store the learned model in the dataset storage unit 40.

Alternatively, the learning processing unit 30 may evaluate a result of machine learning.

(B) Operation of Dataset Generation

Next, an operation in which the dataset generation unit 20 generates a dataset in step S100 of FIG. 4 will be described with reference to the drawings.

FIG. 5 is a flowchart illustrating an example of the operation of the dataset generation unit 20 in the information processing device 1 according to the first example embodiment. In the following description, as an example, it is assumed that the dataset generation unit 20 has received a parameter for generating a dataset. However, the first example embodiment is not limited thereto.

The dataset generation-control unit 21 generates a dataset that stores the processing target image after combining the target region (step S110). For example, the dataset generation-control unit 21 generates a file, a folder, or a database that stores the processing target image.

The dataset generation-control unit 21 may perform control so that the dataset is generated after the target region is combined with the processing target image. For example, the dataset generation-control unit 21 may store the generated processing target images as individual files, and collect the processing target images to generate the dataset after generating all the processing target images.

The dataset generation-control unit 21 may initialize the dataset as necessary. Alternatively, the dataset generation-control unit 21 may store the generated dataset in the dataset storage unit 40.

The generated dataset is used for the calculation of the feature executed in step S101 of FIG. 4 and the machine learning executed in step S102. Therefore, the dataset generation-control unit 21 may generate a dataset related to the feature to be used and the machine learning to be executed.

For example, when the machine learning uses the correspondence between the identifier of the class of the object and the name of the class, the dataset generation-control unit 21 generates a dataset that takes over the correspondence between the identifier of the class included in the base dataset and the name of the class. In this case, the dataset generation-control unit 21 may generate a dataset that does not take over at least a part of other information (for example, the meta information) included in the base dataset.

Alternatively, the dataset generation-control unit 21 may generate a dataset including an image in a format that facilitates calculation of a feature used by the learning processing unit 30 or execution of machine learning.

The dataset generation-control unit 21 controls each component to repeat the loop A (steps S112 to S116) until a predetermined condition (for example, a condition specified by a parameter (hereinafter, referred to as "condition 1")) is satisfied (step S111). For example, the dataset generation-control unit 21 may use a condition that "the number of generated processing target images reaches the number specified by the parameter" as the condition 1. In this case, the dataset generation-control unit 21 controls each component to repeat the loop A until a number of processing target images corresponding to the number specified by the parameter is generated.

The base-image selection unit 22 selects a base image to be subjected to the following operation, and generates a copy (processing target image) of the selected base image (step S112).

Then, the dataset generation-control unit 21 controls each component to repeat the loop B (steps S114 to S115) until a predetermined condition (for example, the condition (hereinafter, referred to as "condition 2") indicated by the parameter) is satisfied (step S113). For example, the dataset generation-control unit 21 may use a condition of "number of combined target regions reaches the number specified by the parameter" as the condition 2. In this case, the dataset generation-control unit 21 controls each component to repeat the loop B until a number of target regions corresponding to the number specified by the parameter is combined with the processing target image.

However, when the operations from steps S114 to S115 cannot be executed, the dataset generation-control unit 21 may end the loop B even if the condition 2 is not satisfied.

For example, when the background range of the processing target image is narrow and a number of target regions corresponding to the number specified by the parameter cannot be combined, the dataset generation-control unit 21 may combine the target regions within a combinable range and end the loop B.

The target-region selection unit 23 selects a target region to be combined with the processing target image from images other than the target base image among the images included in the base dataset (step S114). When selecting the target region in the range of the subset, the target-region selection unit 23 selects the target region from the images included in the subset.

The target-region selection unit 23 may change the shape or the like of the target region. For example, the target-region selection unit 23 may change a width, a height, a size, an aspect ratio, a rotation angle, and an inclination angle of the target region, and a combination of at least some of them as the change of the shape or the like.

The image combining unit 24 combines the image of the target region selected in step S114 with the processing target image (step S115). The image combining unit 24 further adds information on the detection target object in the target region (for example, class and BB) to the information on the detection target object of the processing target image.

In the combination, the image combining unit 24 may execute predetermined processing on the target region. For example, the image combining unit 24 may separate the foreground and the background of the image of the target region and combine the foreground with the target processed image.

When the condition 2 is satisfied and the loop B ends (for example, a predetermined number of target regions are combined), the dataset generation-control unit 21 adds the processing target image and the information on the detection target object included in the processing target image to the dataset (step S116).

When the condition 1 is satisfied and the loop A ends (for example, a predetermined number of processing target images are added to the dataset), the dataset generation unit 20 outputs the dataset and ends the operation.

Based on the above operation, the dataset generation unit 20 generates a dataset used for machine learning by the learning processing unit 30.

[Description of Effects]

Next, effects of the first example embodiment will be described.

The information processing device 1 according to the first example embodiment can achieve an effect of reducing a processing load in machine learning.

The reason is as follows.

The information processing device 1 includes the dataset generation unit 20 and the learning processing unit 30. The dataset generation unit 20 includes a dataset generation-control unit 21, a base-image selection unit 22, a target-region selection unit 23, and an image combining unit 24. The learning processing unit 30 includes a learning-processing control unit 31, a feature calculation unit 32, and a learning execution unit 33. The base-image selection unit 22 selects a base image from a base dataset that is a set of images including a target region including an object to be subjected to machine learning and a background region not including an object to be subjected to machine learning, and generates a processing target image that is a copy of the selected base image. The target-region selection unit 23 selects a target region included in another image included in the base dataset. The image combining unit 24 combines the image of the selected target region and the information on the object to be subjected to the machine learning included in the image of the target region with the processing target image. The dataset generation-control unit 21 controls the base-image selection unit 22, the target-region selection unit 23, and the image combining unit 24 to generate a dataset that is a set of processing target images obtained by combining a predetermined number of target regions. The feature calculation unit 32 calculates a feature of an image included in the dataset. The learning execution unit 33 generates a learned model using first machine learning that is machine learning using a feature and a dataset. The learning-processing control unit 31 outputs the learned model generated by controlling the feature calculation unit 32 and the learning execution unit 33.

The dataset generation unit 20 of the first example embodiment configured as described above generates a dataset used for machine learning on the basis of the base dataset. The dataset generation unit 20 selects an image (base image) from the base dataset, and generates a processing target image obtained by combining an image of a target region in another image included in the base dataset with a background portion (region that is not a target region) of the selected base image.

Furthermore, the dataset generation unit 20 adds information on the detection target object included in the combined target region to the information on the detection target object of the processing target image.

Then, the dataset generation unit 20 generates a dataset including the generated processing target image as a target of the machine learning.

The dataset generation unit 20 generates a processing target image having a smaller background region and a larger target region than the base image of the copy source, and generates a dataset including the generated processing target image. That is, the dataset generated by the dataset generation unit 20 includes an image having fewer background portions that cause a decrease in utilization efficiency of calculation resources in machine learning as compared with the base dataset.

Furthermore, the dataset generation unit 20 adds information on the detection target object included in the combined target region to the information on the detection target object of the processing target image included in the dataset.

Therefore, the learning processing unit 30 can use the information on the detection target object of the processing target image included in the dataset in the calculation of the feature of the image of the dataset.

General machine learning is executed in preprocessing for each iteration at the time of learning in order to obtain an effect of improving accuracy of machine learning (in particular, a class classification layer and a regression layer).

On the other hand, the dataset generation unit 20 of the information processing device 1 generates a dataset so that an effect corresponding to an effect (improvement in accuracy of machine learning) obtained in preprocessing in general machine learning is obtained.

Therefore, the learning processing unit 30 can execute highly accurate machine learning without executing preprocessing on the processing target image included in the dataset. As a result, the information processing device 1 can reduce the load of processing such as preprocessing.

Furthermore, the dataset generated by the dataset generation unit 20 includes an image of a detection target object that has been subjected to processing such as enlargement, reduction, aspect ratio change, rotation, inclination, and lateral and/or vertical inversion in advance. Then, the learning processing unit 30 executes machine learning using such a dataset. Therefore, even when the preprocessing of the dataset is omitted, the information processing device 1 can avoid a decrease in learning accuracy in the learning processing unit 30.

Furthermore, since the learning processing unit 30 does not use preprocessing, the calculated feature can be reused. Therefore, once the feature is calculated, the learning processing unit 30 may not execute the processing of calculating the feature in each iteration in the execution of the machine learning. In this manner, the information processing device 1 can obtain an effect of reducing the load of processing in machine learning.

The processing target image includes a larger number of target regions used for machine learning than the base image that is the copy source. Therefore, using the dataset, the learning processing unit 30 can learn a similar number of target regions even using a smaller number of images as compared with the case of using the base dataset. That is, the number of images included in the dataset may be less than the number of images included in the base dataset. As a result, the information processing device 1 according to the first example embodiment can further shorten the processing time in the machine learning.

In a case where the deviation of the background is large between the processing target image and the target region to be combined with the processing target image, the accuracy of separation between the foreground and the background in the image combining unit 24 is deteriorated. In this case, there is a high possibility that the image combining unit 24 cuts out a foreground that does not appropriately include the detection target object as the foreground to be combined with the processing target image. As a result, there is a high possibility that the accuracy of the machine learning in the learning processing unit 30 is lowered.

Therefore, when the image combining unit 24 separates the foreground and the background, the base dataset used by the dataset generation unit 20 is desirably a dataset (for example, a dataset of images captured by a fixed camera) including many images having similar backgrounds.

Therefore, when the base dataset includes images of different backgrounds, the dataset generation unit 20 may divide the images into subsets (image groups having similar backgrounds) on the basis of the backgrounds, and generate the processing target image using the images in the subsets.

In this case, the target region selected for combining is assumed to have a small difference from the pixels at the boundary and the periphery at the combining position in the processing target image. Therefore, the generated processing target image is an image that reduces a decrease in accuracy of separation between the foreground and the background in the image combining unit 24. In a case where the processing target image is generated using such an image, the dataset generation unit 20 can generate a dataset in which the foreground is more appropriately combined.

The target-region selection unit 23 may change the shape (for example, a width, a height, a size, or an aspect ratio), angle, and/or inclination of the target region so as to be suitable for machine learning. Alternatively, the image combining unit 24 may apply predetermined processing (for example, enlargement, reduction, lateral inversion, and/or vertical inversion) to the target region so as to be suitable for machine learning.

The dataset generation unit 20 can improve the accuracy of machine learning in the learning processing unit 30 using these processes.

[Variations]

In the above description, the dataset generation unit 20 uses one base dataset. However, the first example embodiment is not limited thereto. The dataset generation unit 20 may generate a dataset to be subjected to machine learning using a plurality of base datasets.

Furthermore, in the above description, the dataset generation unit 20 receives the number of images included in the dataset to be generated as a parameter. However, the first example embodiment is not limited thereto.

The dataset generation unit 20 may dynamically determine the number of images to be generated.

For example, the dataset generation unit 20 may generate images at a predetermined ratio to the number of images included in the base dataset as the dataset used for machine learning.

Alternatively, for example, the dataset generation unit 20 may end the generation of the processing target image when any one of the following conditions or a combination of conditions is satisfied in "dataset generation operation (specifically, loop A illustrated in FIG. 5)".

(1) In the entire dataset being generated, the total number of target regions combined with the processing target image or the total number of target regions including the target region originally included in the processing target image exceeds a predetermined value.

(2) In the entire dataset being generated, the sum of the areas of the target regions combined with the processing target image or the sum of the areas of the target regions including the area of the target region originally included in the processing target image exceeds a predetermined value.

(3) In the entire dataset being generated, the ratio of the area of the target region to the area of the background region exceeds a predetermined value.

The dataset generation unit 20 may receive a value for determination under the above conditions as a parameter or may store the value in advance. For example, the dataset generation unit 20 may receive a value for determination from the operator prior to the operation. Alternatively, the dataset generation unit 20 may calculate the above value using any of the received parameters.

The dataset generation unit 20 may dynamically determine or change parameters other than the number of images included in the dataset.

As described above, the case where the information processing device 1 according to the first example embodiment generates a dataset used for a task such as an object detection task having a higher load than a general task has been described. However, the use of the information processing device 1 is not limited to the object detection task. The information processing device 1 may be used for a task different from the object detection task.

Furthermore, in the above description, an example has been described in which the information processing device 1 reuses the feature calculated for the image of the dataset in the feature calculation unit 32.

However, the reuse in the information processing device 1 is not limited to the feature of the image. For example, the feature reused by the information processing device 1 may be a value different from a feature in a general sense such as a feature of an image.

For example, in the configuration illustrated in FIG. 17, the feature is an output of the feature extraction layer, and is an input of the class classification layer and the regression layer. However, the feature extraction layer includes a plurality of layers in specific implementation. As described above, machine learning generally uses a hierarchical structure. Therefore, the information processing device 1 may reuse not the finally output feature but the feature calculated in the middle layer in the configuration used for calculating the feature. Alternatively, the information processing device 1 is not limited to the configuration for calculating the feature, and may reuse the output of the intermediate layer in the configuration for executing the class classification processing and/or the configuration for executing the regression processing. As described above, the information processing device 1 may use an output of a predetermined layer of a configuration used for machine learning as the feature to be reused.

That is, the information processing device 1 may reuse the processing result in any layer in the machine learning without being limited to the feature.

In the above description, the reuse of the feature related to the deep learning NN has been used. However, the machine learning in the information processing device 1 is not limited to the deep learning NN. For example, the information processing device 1 may use a support vector machine (SVM) as the machine learning.

[Hardware Configuration]

In the above description, an example in which the learning control unit 10, the dataset generation unit 20, the learning processing unit 30, the dataset storage unit 40, and the feature storage unit 50 are included in the same device (the information processing device 1) has been described. However, the first example embodiment is not limited thereto.

For example, the information processing device 1 may be configured by connecting devices having functions corresponding to the components via a predetermined network. Alternatively, the information processing device 1 may be implemented using a service that does not limit hardware resources, such as cloud computing.

Alternatively, each component of the information processing device 1 may be configured by a hardware circuit.

Alternatively, in the information processing device 1, a plurality of components may be configured by one piece of hardware.

Alternatively, the information processing device 1 may be configured as hardware that executes software for implementing each function.

Alternatively, the information processing device 1 may be implemented as a computer device including a CPU, a read only memory (ROM), and a random access memory (RAM). In addition to the above configuration, the information processing device 1 may be implemented as a computer device including an input and output circuit (IOC). In addition to the above configuration, the information processing device 1 may be implemented as a computer device including a network interface circuit (NIC). Furthermore, in addition to the above configuration, the information processing device 1 may be implemented as a computer device including an arithmetic circuit that performs some or all calculations of machine learning.

FIG. 14 is a block diagram illustrating a configuration of an information processing device 600 which is an example of a hardware configuration of the information processing device 1.

The information processing device 600 includes a CPU 610, a ROM 620, a RAM 630, an internal storage device 640, an IOC 650, an NIC 680, and an arithmetic unit 611, and constitutes a computer device.

The CPU 610 reads a program from the ROM 620 and/or the internal storage device 640. Then, the CPU 610 controls the RAM 630, the internal storage device 640, the IOC 650, the NIC 680, and the arithmetic unit 611 on the basis of the read program. Then, the computer device including the CPU 610 controls these components and implements the functions of the learning control unit 10, the dataset generation unit 20, and the learning processing unit 30 illustrated in FIG. 1. Furthermore, the computer device including the CPU 610 controls these components, and implements the functions of the dataset generation-control unit 21, the base-image selection unit 22, the target-region selection unit 23, and the image combining unit 24 illustrated in FIG. 2. Furthermore, the computer device including the CPU 610 controls these components and implements the functions of the learning-processing control unit 31, the feature calculation unit 32, and the learning execution unit 33 illustrated in FIG. 3.

When implementing each function, the CPU 610 may use the RAM 630 or the internal storage device 640 as a medium for temporary storage of a program.

In addition, the CPU 610 may read the program included in a recording medium 690 storing the program in a computer readable manner using a recording medium reading device (not illustrated). Alternatively, the CPU 610 may receive a program from an external device (not illustrated) via the NIC 680, store the program in the RAM 630 or the internal storage device 640, and operate on the basis of the stored program.

The arithmetic unit 611 is an arithmetic circuit that is controlled by a program executed by the CPU 610 and executes part or all of the machine learning calculations.

The configuration of the arithmetic unit 611 is optional. For example, the arithmetic unit 611 may be a circuit or the following elements.

Graphics Processing Unit (GPU);
Field-Programmable Gate Array (FPGA); or
Application Specific Integrated Circuit (ASIC).

The CPU 610 transmits information (for example, data, programs, and circuit information) necessary for execution of the arithmetic unit 611 to the arithmetic unit 611 before execution of the arithmetic unit 611 as necessary. These pieces of information may be stored in advance in the ROM

620 or the internal storage device 640. Alternatively, the CPU 610 may acquire the information from an external device (not illustrated) as necessary.

The ROM 620 stores programs executed by the CPU 610 and fixed data. The ROM 620 is, for example, a programmable ROM (P-ROM) or a flash ROM.

The RAM 630 temporarily stores programs and data executed by the CPU 610. The RAM 630 is, for example, a dynamic-RAM (D-RAM).

The internal storage device 640 stores data and programs to be stored for a long period of time by the information processing device 600. The internal storage device 640 operates as the dataset storage unit 40 and the feature storage unit 50. Furthermore, the internal storage device 640 may operate as a temporary storage device of the CPU 610. The internal storage device 640 is, for example, a hard disk device, a magneto-optical disk device, a solid state drive (SSD), or a disk array device.

The ROM 620 and the internal storage device 640 are non-transitory recording media. On the other hand, the RAM 630 is a transitory recording medium. The CPU 610 is operable based on a program stored in the ROM 620, the internal storage device 640, or the RAM 630. That is, the CPU 610 can operate using a non-transitory recording medium or a transitory recording medium.

The IOC 650 mediates data between the CPU 610, an input device 660, and a display device 670. The IOC 650 is, for example, an IO interface card or a universal serial bus (USB) card. Furthermore, the IOC 650 is not limited to wired communication such as USB, and may be wireless communication.

The input device 660 is a device that receives an instruction from an operator of the information processing device 600. For example, the input device 660 receives a parameter and transmits the parameter to the information processing device 600. The input device 660 is, for example, a keyboard, a mouse, or a touch panel.

The display device 670 is a device that displays information to the operator of the information processing device 600. The display device 670 is, for example, a liquid crystal display, an organic electroluminescence display, or electronic paper.

The NIC 680 relays exchange of data with an external device (not illustrated) via a network. The NIC 680 is, for example, a local area network (LAN) card. Furthermore, the NIC 680 is not limited to wired communication, and may be wireless communication.

The information processing device 600 configured as described above can obtain effects similar to those of the information processing device 1.

The reason is that the CPU 610 of the information processing device 600 can implement the same function as that of the information processing device 1 on the basis of the program. Alternatively, this is because the CPU 610 and the arithmetic unit 611 of the information processing device 600 can implement functions similar to those of the information processing device 1 on the basis of a program.

Second Example Embodiment

An information processing device 1B according to the second example embodiment generates a dataset on the basis of a result of machine learning using a base dataset.

The second example embodiment will be described with reference to the drawings. In the drawings used for description of the second example embodiment, the same configurations and operations as those of the first example embodiment are denoted by the same reference numerals, and detailed description thereof is omitted.

[Description of Configuration]

A configuration of the information processing device 1B according to the second example embodiment will be described with reference to the drawings. The information processing device 1B may be configured using a computer device as illustrated in FIG. 14, similarly to the first example embodiment.

Figure 6:
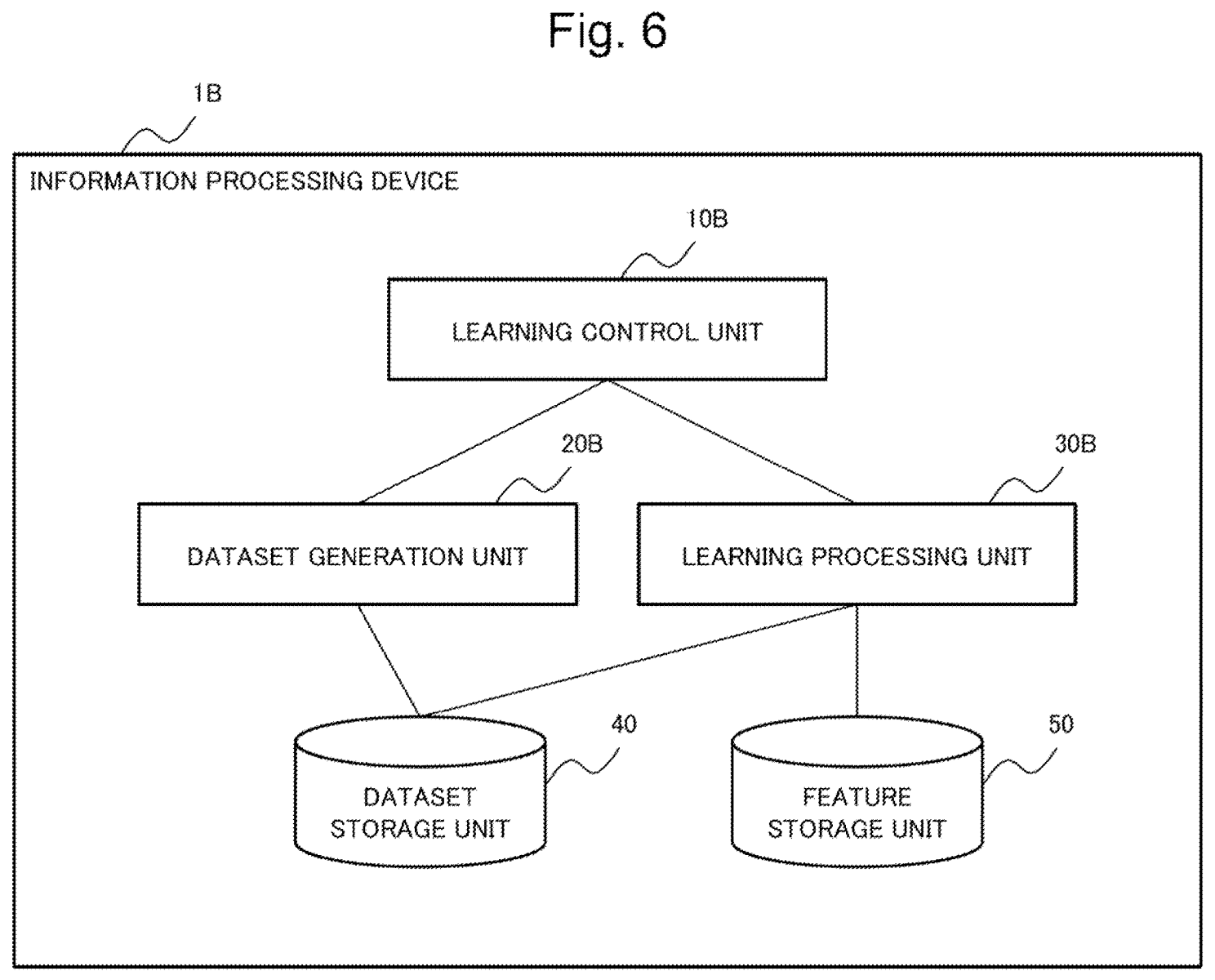

FIG. 6 is a block diagram illustrating an example of a configuration of the information processing device 1B according to the second example embodiment.

The information processing device 1B illustrated in FIG. 6 includes a learning control unit 10B, a dataset generation unit 20B, a learning processing unit 30B, a dataset storage unit 40, and a feature storage unit 50.

Since the dataset storage unit 40 and the feature storage unit 50 are similar to those of the first example embodiment, detailed description thereof will be omitted.

The learning control unit 10B executes the following control in addition to the control in the learning control unit 10 of the first example embodiment.

First, the learning control unit 10B causes the learning processing unit 30B to execute machine learning using the base dataset and evaluation on a result of the machine learning. Then, the learning control unit 10B instructs the dataset generation unit 20B to generate a dataset based on the evaluation in the learning processing unit 30B. Then, the learning control unit 10B causes the learning processing unit 30B to execute machine learning using the generated dataset.

The learning control unit 10B may control the machine learning for the base dataset in the learning processing unit 30B and the generation of the dataset in the dataset generation unit 20B so as to operate for each subset of the base dataset.

The learning processing unit 30B executes machine learning similarly to the learning processing unit 30 of the first example embodiment. However, the learning processing unit 30B executes machine learning using the base dataset in addition to machine learning using the dataset.

The learning processing unit 30B may execute machine learning different from the machine learning using the dataset in the machine learning using the base dataset.

For example, the learning processing unit 30B may execute machine learning after executing preprocessing on an image including the base dataset. Alternatively, the learning processing unit 30B may execute, as machine learning using the base dataset, machine learning that does not reuse a part or all of the features calculated from the images included in the base dataset. Alternatively, the learning processing unit 30B may use machine learning (for example, NNs with different structures) different from machine learning using a dataset as machine learning using a base dataset.

As described above, the learning processing unit 30B may use machine learning different from machine learning using a dataset for machine learning using a base dataset. Hereinafter, when machine learning is distinguished, machine learning using a dataset is referred to as "first machine learning". Then, when the learning processing unit 30B executes machine learning different from the first machine learning as the machine learning using the base dataset, the machine learning different from the first machine learning is referred to as "second machine learning".

Furthermore, the learning processing unit 30B evaluates a result of machine learning using the base dataset. For example, the learning processing unit 30B may evaluate the accuracy of recognition of an object to be subjected to machine learning as evaluation of a result of machine learning using the base dataset.

The dataset generation unit 20B generates a dataset similarly to the dataset generation unit 20 of the first example embodiment. However, the dataset generation unit 20B generates a dataset using the result of evaluation of machine learning using the base dataset in the learning processing unit 30B.

Next, a configuration of the dataset generation unit 20B in the second example embodiment will be described with reference to the drawings.

FIG. 7 is a block diagram illustrating an example of a configuration of the dataset generation unit 20B according to the second example embodiment.

The dataset generation unit 20B includes a dataset generation-control unit 21B, a base-image selection unit 22B, a target-region selection unit 23B, and an image combining unit 24.

In addition to the control in the dataset generation-control unit 21 of the first example embodiment, the dataset generation-control unit 21B controls the generation of the dataset so as to be based on the evaluation of the result of the machine learning using the base dataset in the learning processing unit 30B.

The dataset generation-control unit 21B may determine parameters related to generation of the dataset with reference to evaluation of a result of machine learning using the base dataset.

For example, the dataset generation-control unit 21B may execute the following operation.

(1) In the evaluation of the machine learning using the base dataset, the dataset generation-control unit 21B changes the number of images to be generated for the subset in which the recognition accuracy of the objects to be subjected to the machine learning is low. For example, the dataset generation-control unit 21B may increase the number of images including the dataset to be generated for the subset having low recognition accuracy. That is, the dataset generation-control unit 21B may generate a dataset to be subjected to machine learning by preferentially using a subset of images having low recognition accuracy. In this case, the learning processing unit 30B learns a dataset including many images included in the subset with low recognition accuracy. As a result, the recognition accuracy in the subset with low recognition accuracy is improved.

(2) In the evaluation of the machine learning using the base dataset, the dataset generation-control unit 21B changes the maximum number of target regions to be combined for a subset, a class, or the like having low recognition accuracy. For example, the dataset generation-control unit 21B may increase the number of target regions to be combined for a subset having low recognition accuracy. Also in this case, the recognition accuracy in the subset with low recognition accuracy is improved.

The base-image selection unit 22B selects the base image using a result of machine learning using the base dataset in addition to the operation in the base-image selection unit 22 of the first example embodiment. For example, the base-image selection unit 22B may select the base image using any one of the following selections or a combination of selections.

(1) In the evaluation of machine learning using the base dataset, images in a subset including images with low recognition accuracy are preferentially selected.

(2) In the evaluation of machine learning using the base dataset, images in the subset with low recognition accuracy are preferentially selected.

(3) In the evaluation of the machine learning using the base dataset, an image including many target regions including the detection target object of the same class as the class of the detection target object with low recognition accuracy is preferentially selected.

(4) In the evaluation of the machine learning using the base dataset, an image including many target regions of a size with low recognition accuracy is preferentially selected.

The target-region selection unit 23B selects the target region using the result of the machine learning using the base dataset in addition to the operation in the target-region selection unit 23 of the first example embodiment. For example, the target-region selection unit 23B may select the target region using any one of the following selections or a combination of selections.

(1) In the evaluation of machine learning using the base dataset, a target region included in an image with low recognition accuracy is preferentially selected.

(2) In evaluation of machine learning using the base dataset, a target region of an image included in a class with low recognition accuracy is preferentially selected.

(3) In the evaluation of the machine learning using the base dataset, a target region having a size with low recognition accuracy is preferentially selected.

(4) In the evaluation of machine learning using the base dataset, a target region with low recognition accuracy is preferentially selected.

Furthermore, in a case of changing the shape or the like of the target region, the target-region selection unit 23B may determine the change in the shape or the like of the target region using the result of machine learning using the base dataset in addition to the operation in the target-region selection unit 23 of the first example embodiment.

For example, the target-region selection unit 23B may determine the change of the shape of the target region using any one of the following selections or a combination of selections.

(1) The change in the width, height, and/or size of the target region is determined so that the width, height, and/or size with low recognition accuracy are increased in the evaluation of the machine learning using the base dataset.

(2) The change of the aspect ratio of the target region is determined so that the number of aspect ratios with low recognition accuracy increases in the evaluation of machine learning using the base dataset.

(3) The change of the orientation of the target region is determined so that the number of orientations of objects with low recognition accuracy in the evaluation of the machine learning using the base dataset increases.

(4) The change of the angle and/or inclination of the target region is determined so that the angle and/or inclination of the object with low recognition accuracy in the evaluation of the machine learning using the base dataset are increased.

The target-region selection unit 23B may dynamically change the determination criterion of the above determination. For example, the target-region selection unit 23B may dynamically adjust the upper limit value and the lower limit value of the random number value used for the determination criterion using another random number. Alternatively, the target-region selection unit 23B may adjust the distribution of the random number value when generating the random number value used for the determination criterion using another random number.

The base-image selection unit 22B and the target-region selection unit 23B may use a condition of "loss (for example, information loss) in machine learning is large" instead of the determination condition of "recognition accuracy is low".

The image combining unit 24 combines the processing target image and the target region selected on the basis of the evaluation result of the base dataset described above. However, as described above, the image combining unit 24 combines the processing target image selected on the basis of the evaluation of the result of the machine learning using the base dataset with the target region.

As a result, the dataset generation unit 20B generates a dataset including an image appropriate as a target of machine learning in the learning processing unit 30B.

Any one of the base-image selection unit 22B and the target-region selection unit 23B may use a result of evaluation of machine learning using the base dataset.

[Description of Operation]

Next, an operation of the information processing device 1B according to the second example embodiment will be described with reference to the drawings.

FIG. 8 is a flowchart illustrating an example of an operation of machine learning in the information processing device 1B according to the second example embodiment.

The information processing device 1B starts operation when a predetermined condition is satisfied. For example, the information processing device 1B starts machine learning in response to an instruction from an operator. In this case, at the start of the machine learning, the information processing device 1B may receive another parameter in addition to the parameter necessary for the machine learning from the operator as the parameter related to the machine learning. For example, the information processing device 1B may receive the base dataset and parameters related to generation of the dataset from the operator.

The learning control unit 10B instructs the learning processing unit 30B to perform machine learning using the base dataset. The learning processing unit 30B executes machine learning using the base dataset (step S200). Furthermore, the learning processing unit 30B evaluates a result of machine learning using the base dataset. The learning processing unit 30B may receive parameters used for machine learning of the base dataset.

The learning control unit 10B instructs the dataset generation unit 20B to generate a dataset based on the base dataset and the evaluation of the result of the machine learning using the base dataset in step S200. The dataset generation unit 20B generates a dataset based on the base dataset and the evaluation of the result of the machine learning using the base dataset (step S201). The dataset generation unit 20 may receive a parameter for generating the dataset.

The learning control unit 10B instructs the learning processing unit 30B to calculate a feature for each image of the generated dataset. The learning processing unit 30B calculates a feature for each image of the generated dataset (step S202). The learning processing unit 30B stores the calculated feature in the feature storage unit 50. The learning processing unit 30B may receive a parameter used for calculation of the feature.

Then, the learning control unit 10B instructs the learning processing unit 30B to perform machine learning using the dataset and the feature. The learning processing unit 30B executes machine learning using the generated dataset and the calculated feature (step S203). The learning processing unit 30B may receive parameters used for machine learning of the dataset.

As described above, the dataset generation unit 20B generates the dataset on the basis of the evaluation of the result of the machine learning using the base dataset. Then, the learning processing unit 30B executes machine learning using the generated dataset.

[Description of Effects]

Next, effects of the second example embodiment will be described.

The second example embodiment can implement the following effects in addition to the same effects as those of the first example embodiment (such as reduction in processing load in machine learning).

A second example embodiment generates a dataset using a result of machine learning using a base dataset. Therefore, the second example embodiment has an effect of generating a more appropriate dataset.

For example, in the second example embodiment, a target region of a subset with low recognition accuracy, a target region of a class with low recognition accuracy, or a target region of an image with low recognition accuracy is preferentially used in the evaluation of the machine learning of the base dataset to generate a dataset to be subjected to the machine learning.

Alternatively, the second example embodiment generates a dataset including many target regions of shapes (for example, width, height, size, and/or aspect ratio), orientations, and/or inclinations having low recognition accuracy in evaluation of machine learning of the base dataset.

As described above, the second example embodiment generates a dataset having low recognition accuracy and including a large number of target regions that are desirable to be targets of learning. Therefore, in the second example embodiment, the recognition accuracy in the learning result can be improved in the machine learning using the generated dataset.

[Variations]

In the description of the second example embodiment so far, the dataset generation unit 20B generates the dataset once. However, the second example embodiment is not limited thereto.

For example, the learning processing unit 30B may evaluate a result of machine learning (first machine learning) using a dataset. Then, the learning control unit 10B may control the dataset generation unit 20B to generate the dataset again using the evaluation of the result of the machine learning using the dataset. In this case, the dataset generation unit 20B regenerates the dataset using the evaluation result of the machine learning using the dataset in the learning processing unit 30B. As a result, the dataset generation unit 20B can further regenerate a dataset suitable for machine learning. The learning processing unit 30B may execute machine learning using the regenerated dataset. The information processing device 1B may repeat the above operation until a predetermined condition is satisfied.

Third Example Embodiment

An information processing device 1C according to the third example embodiment dynamically changes the feature to be reused. For example, when the feature to be reused is the output of the layer constituting the NN, the information processing device 1C dynamically changes the layer of the NN that outputs the feature to be reused.

The third example embodiment will be described with reference to the drawings. In the drawings used for description of the third example embodiment, the same configurations and operations as those of the first example embodiment are denoted by the same reference numerals, and detailed description thereof is omitted. The information processing device 1C may execute machine learning using the base dataset similarly to the second example embodiment.

[Description of Configuration]

A configuration of the information processing device 1C according to a third example embodiment will be described with reference to the drawings. The information processing device 1C may be configured using a computer device as illustrated in FIG. 14, similarly to the first example embodiment.

Figure 9:
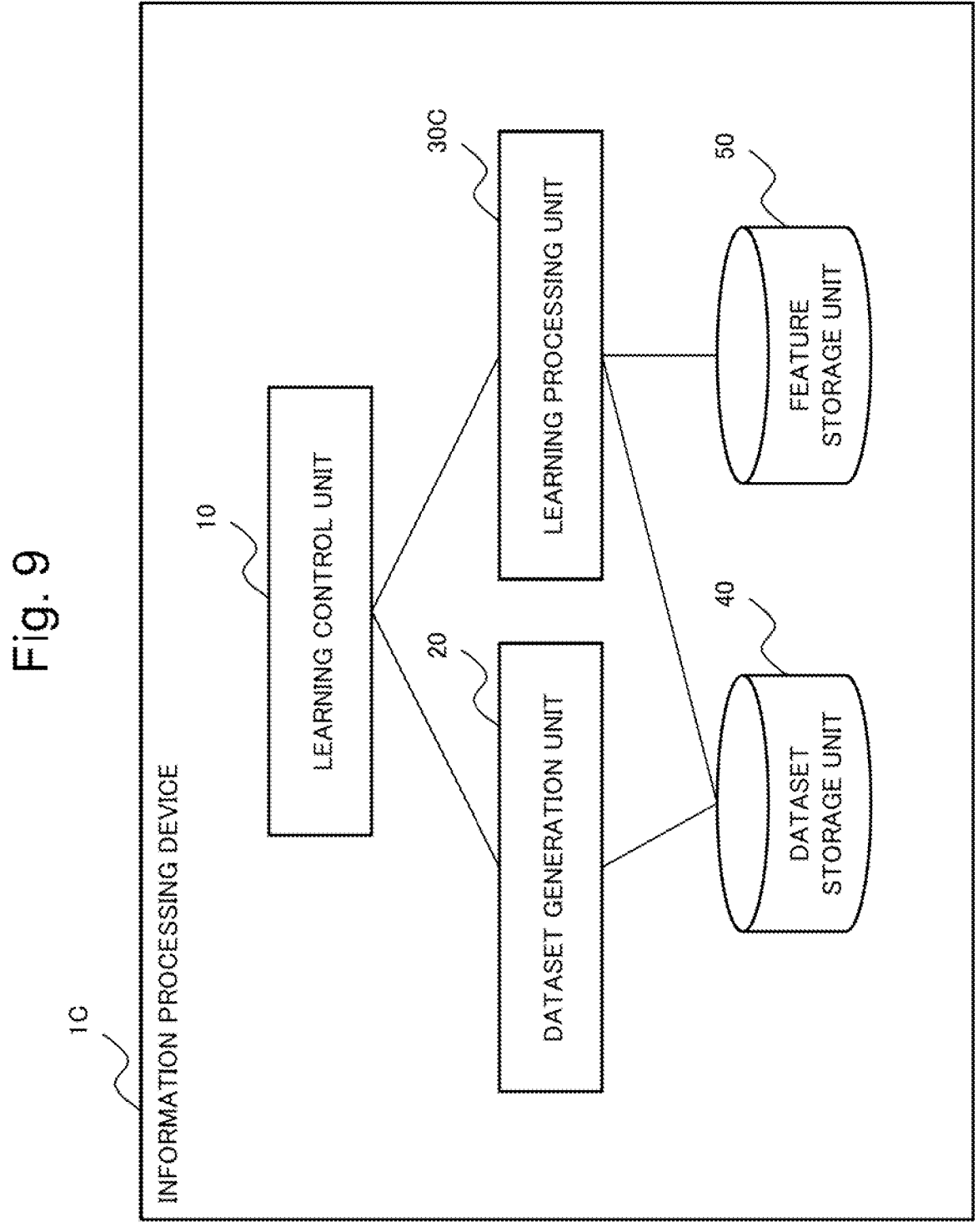
FIG. 9 is a block diagram illustrating an example of a configuration of an information processing device according to a third example embodiment.

FIG. 9 is a block diagram illustrating an example of a configuration of the information processing device 1C according to the third example embodiment.

The information processing device 1C illustrated in FIG. 9 includes a learning control unit 10, a dataset generation unit 20, a learning processing unit 30C, a dataset storage unit 40, and a feature storage unit 50.

Since the learning control unit 10, the dataset generation unit 20, the dataset storage unit 40, and the feature storage unit 50 are similar to those of the first example embodiment, detailed description thereof will be omitted.

The learning processing unit 30C executes two types of machine learning using the dataset.

First, the learning processing unit 30C executes machine learning (hereinafter, sometimes referred to as "third machine learning") using a dataset without reusing a feature in the first machine learning.

Then, the learning processing unit 30C checks the execution status of the first machine learning (third machine learning). For example, the learning processing unit 30C checks the execution status of the calculation processing related to the first machine learning. Hereinafter, this checking operation is referred to as "profiling", and execution of the operation is referred to as "profile".

Then, the learning processing unit 30C determines a feature to be reused in the second machine learning using a result of profiling of the first machine learning (third machine learning). Then, the learning processing unit 30C executes the machine learning (first machine learning) of the second dataset by reusing the determined feature. That is, the learning processing unit 30C executes machine learning (first machine learning) similar to that of the first example embodiment except that a feature to be reused is selected using a result of profiling of the first machine learning as the second machine learning.

Furthermore, the learning processing unit 30C redetermines the feature to be reused in the third and subsequent machine learning using the result of the profiling of the previous machine learning. Then, the learning processing unit 30C executes machine learning (first machine learning) of the dataset by reusing the redetermined feature. In this manner, the learning processing unit 30C repeatedly executes the machine learning until the predetermined end condition is satisfied while redetermining the feature to be reused (that is, while the feature to be reused is dynamically changed) using the result of the profiling of the previous machine learning.

The learning processing unit 30C may execute machine learning in which all the features are calculated but are not reused in the first machine learning. In this case, the learning processing unit 30C may store the feature calculated in the first machine learning in the feature storage unit 50 in order to reuse the feature in the second and subsequent machine learning.

Alternatively, the learning processing unit 30C may not execute the calculation of the feature in the feature calculation unit 32C in the first machine learning. In this case, the learning-processing control unit 31C controls the learning execution unit 33C to execute, as the first machine learning, machine learning that does not use the feature calculated by the feature calculation unit 32C.

Alternatively, in order to reduce the processing load, the learning processing unit 30C may execute the machine learning by limiting the range of the feature used in the first machine learning.

In a case where some or all of the features are not calculated, there is a case where the feature determined to be reused in the second and subsequent machine learning is not stored in the feature storage unit 50.

In such a case, the learning processing unit 30C may calculate the feature for the feature (uncalculated feature) that is not stored among the features determined to be reused, store the feature in the feature storage unit 50, and then execute machine learning (first machine learning) in which the feature is reused. In this manner, the learning processing unit 30C may execute the first machine learning while calculating and adding an uncalculated feature among the features determined to be reused.

Next, a configuration of the learning processing unit 30C in the third example embodiment will be described with reference to the drawings.

FIG. 10 is a block diagram illustrating an example of a configuration of the learning processing unit 30C according to the third example embodiment.

The learning processing unit 30C includes a learning-processing control unit 31C, a feature calculation unit 32C, and a learning execution unit 33C.

The learning-processing control unit 31C executes the following control in addition to the control in the learning-processing control unit 31 of the first example embodiment.

In the first machine learning, the learning-processing control unit 31C controls the feature calculation unit 32C and the learning execution unit 33C to execute machine learning (third machine learning) without reusing all the features.

In a case where the feature is not calculated in the first machine learning, the learning-processing control unit 31C may not control the feature calculation unit 32C.

Then, the learning-processing control unit 31C profiles the execution statuses of the calculation processing in the feature calculation unit 32C and the learning execution unit 33C.

Then, in the second and subsequent machine learning, the learning-processing control unit 31C determines the feature to be reused using the result of the profiling. Then, the learning-processing control unit 31C controls the feature calculation unit 32C and the learning execution unit 33C to execute machine learning (first machine learning) in which the determined feature is reused.

The generation source of the information used for profiling in the learning-processing control unit 31C is optional. For example, the learning-processing control unit 31C may collect information output when the feature calculation unit 32C and the learning execution unit 33C operate and profile the execution status. Alternatively, the feature calculation unit 32C and the learning execution unit 33C may notify the learning-processing control unit 31C of the execution status. Alternatively, software (for example, the management module of the virtual machine) or hardware (for example, the load monitoring device) configuring the function of the learning processing unit 30C may notify the learning-processing control unit 31C of information necessary for profiling.

Next, an example of information collected by the learning-processing control unit 31C will be described.

For example, the learning-processing control unit 31C may collect information on the following layer of the NN or a combination of at least some pieces of information as information necessary for profiling. However, the information necessary for profiling in the present example embodiment is not limited to the following.

(1) Calculation time for each layer.
(2) GFLOPS (Giga Floating point number Operations Per Second) values for each layer.
(3) Hardware resource allocation rate for each layer.
(4) Hardware resource usage efficiency for each layer.
(5) The amount of communication on the bus for each layer.
(6) Memory usage for each layer.
(7) The size of the feature for each layer.

The learning-processing control unit 31C may collect information used for profiling not for each layer but for each channel in the NN. That is, the learning-processing control unit 31C may profile the channel in the NN.

The learning-processing control unit 31C may complement a part of the above information with static information (for example, the resource amount on the setting) given in advance. For example, the learning-processing control unit 31C may acquire complementary static information from an operator or the like in advance.

The learning-processing control unit 31C determines the feature to be reused so as to reduce the processing load using the result of the profiling.

For example, the learning-processing control unit 31C determines which layer's output is used as the feature to be reused using the collected profiling result. More specifically, for example, the learning-processing control unit 31C calculates, for each layer, a decrease in the load (for example, processing time) of the entire processing of the learning processing when the output of the layer is reused. Then, the learning-processing control unit 31C determines the output of the layer to be reused so that the load of the entire processing (for example, the overall processing time) decreases.

The range of the layer to be reused may be determined in advance. For example, the learning-processing control unit 31C may determine a feature to be reused (output of a layer to be reused) for a layer group specified in advance (for example, given from an operator).

Alternatively, the learning-processing control unit 31C may determine the feature to be reused on the basis of resources (for example, memory capacity, disk capacity, and/or bus bandwidth) of hardware constituting the information processing device 1C. For example, the learning-processing control unit 31C may determine the feature to be reused so as to increase the utilization efficiency of the resource. The resource used for determination may be set in the learning-processing control unit 31C in advance. For example, the operator sets a resource to be used for determination in the learning-processing control unit 31C in advance.

In this manner, the learning-processing control unit 31C dynamically determines the feature to be reused using the result of the profiling.

The feature calculation unit 32C calculates a feature similarly to the feature calculation unit 32 of the first example embodiment. However, the feature calculation unit 32C calculates a feature that is not stored in the feature storage unit 50 among the features determined to be reused by the learning-processing control unit 31C.

The feature calculated by the feature calculation unit 32C is not limited to a feature in a general sense such as a feature of an image. For example, the feature calculation unit 32C may use an output of a predetermined layer in deep learning as a calculation target.

The learning execution unit 33C executes the machine learning by reusing the feature similarly to the learning execution unit 33 of the first example embodiment. However, the learning execution unit 33C executes machine learning by reusing the feature determined to be reused by the learning-processing control unit 31C.

In the first machine learning, the learning execution unit 33C executes machine learning (third machine learning) that does not reuse the feature on the basis of an instruction from the learning-processing control unit 31C.

[Description of Operation]

Next, an operation of the learning processing unit 30C according to the third example embodiment will be described with reference to the drawings.

Figure 11:
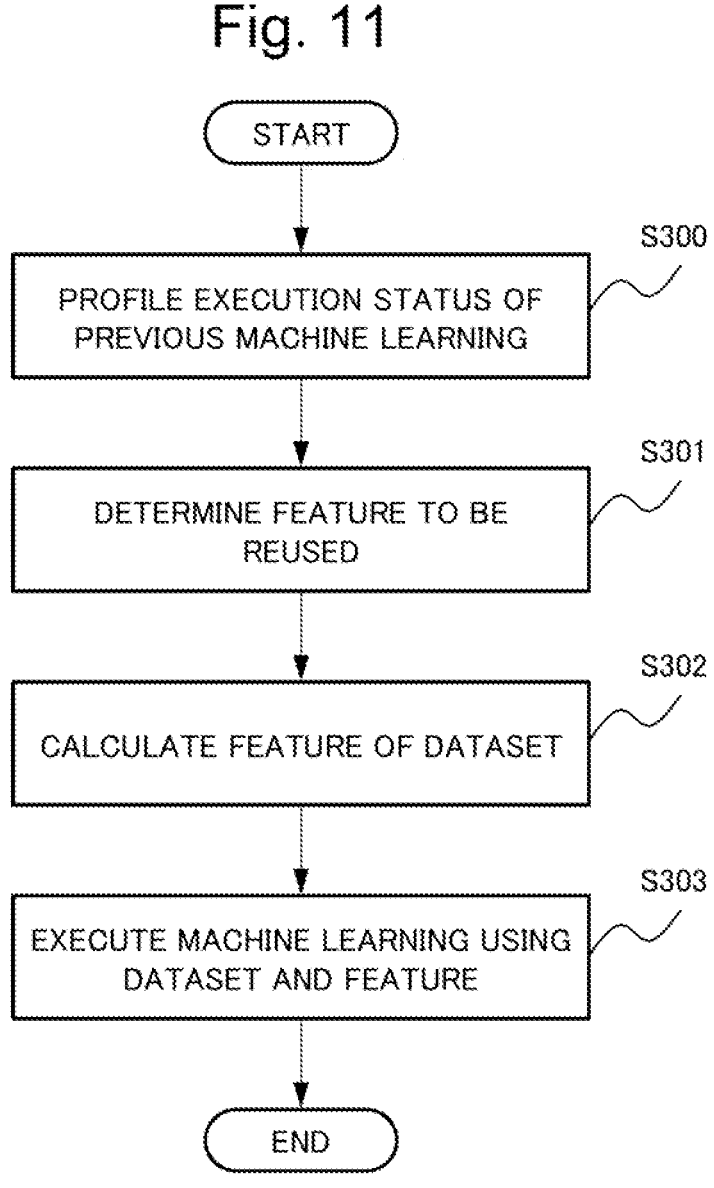
FIG. 11 is a flowchart illustrating an example of operation of machine learning using profiling in a learning processing unit according to the third example embodiment.

FIG. 11 is a flowchart illustrating an example of an operation of machine learning (second and subsequent machine learning) using a result of profiling in the learning processing unit 30C according to the third example embodiment.

First, the learning-processing control unit 31C profiles the execution status of the previous machine learning (step S300).

The learning-processing control unit 31C determines a feature to be reused on the basis of the result of the profiling (step S301).

The learning-processing control unit 31C instructs calculation of the feature of the image including the dataset for the feature determined to be reused by the feature calculation unit 32C. The feature calculation unit 32C calculates an instructed feature in the image included in the dataset (step S302). The feature calculation unit 32C stores the calculated feature in the feature storage unit 50.

In a case where it is determined that the feature already stored in the feature storage unit 50 is reused, the learning-processing control unit 31C omits the operation of step S302.

The learning-processing control unit 31C instructs the learning execution unit 33C to execute the machine learning using the dataset and the feature determined to be reused. The learning execution unit 33C executes machine learning using the dataset and the feature (step S303).

The learning processing unit 30C executes machine learning by repeating the above operation until a predetermined condition is satisfied.

Profiling may take time. For example, information necessary for profiling may not be collected at the time of executing the second machine learning. In such a case, the learning processing unit 30C may execute machine learning (third machine learning) that does not reuse the feature until the profiling is completed. Alternatively, similarly to the first example embodiment, the learning processing unit 30C may operate to reuse all the features.

Then, when the profiling ends, the learning-processing control unit 31C may end the operations of the feature calculation unit 32C and the learning execution unit 33C at a predetermined time point and start an operation using profiling.

However, there is a case where the learning-processing control unit 31C can determine the feature to be reused using a result of some profiling before completion of all profiling. For example, a result of partial profiling may be used to determine a feature to be reused so that the processing load can be reduced. Therefore, the learning-processing control unit 31C may start an operation using profiling at a stage where part of the profiling is completed.

However, the learning-processing control unit 31C may start an operation using profiling after sufficient profiling results are collected (for example, after the execution status of the calculation processing is stabilized). Stabilization of the execution status of the calculation processing is a case where a variation of at least a part of the value indicating the execution status of the calculation processing is within a predetermined range in a predetermined period.

[Description of Effects]

Next, effects of the third example embodiment will be described.

The third example embodiment can implement the following effects in addition to the same effects as those of the first example embodiment (such as reduction in processing load in machine learning).

A third example embodiment determines a feature to be reused based on profiling. Therefore, the third example embodiment has an effect that the feature to be reused can be determined according to the execution situation of the machine learning. The reuse of the feature reduces the load of machine learning. That is, in the third example embodiment, the load of the machine learning is reduced in accordance with the execution situation of the machine learning.

[Variations]

In the above description, in the third example embodiment, a result of profiling is used for machine learning of a dataset. However, the operation of using the profiling result is not limited thereto. For example, when the information processing device 1C executes machine learning using the base dataset similarly to the second example embodiment, the information processing device 1C may execute machine learning using the base dataset using a result of profiling.

The information processing device 1C may receive the profiling result from the outside. For example, the information processing device 1C may receive a result of profiling from the load monitoring device. In this case, the information processing device 1C may not execute the processing of calculating the profiling result.

Fourth Example Embodiment

An outline of the above example embodiment will be described as a fourth example embodiment.

Figure 15:
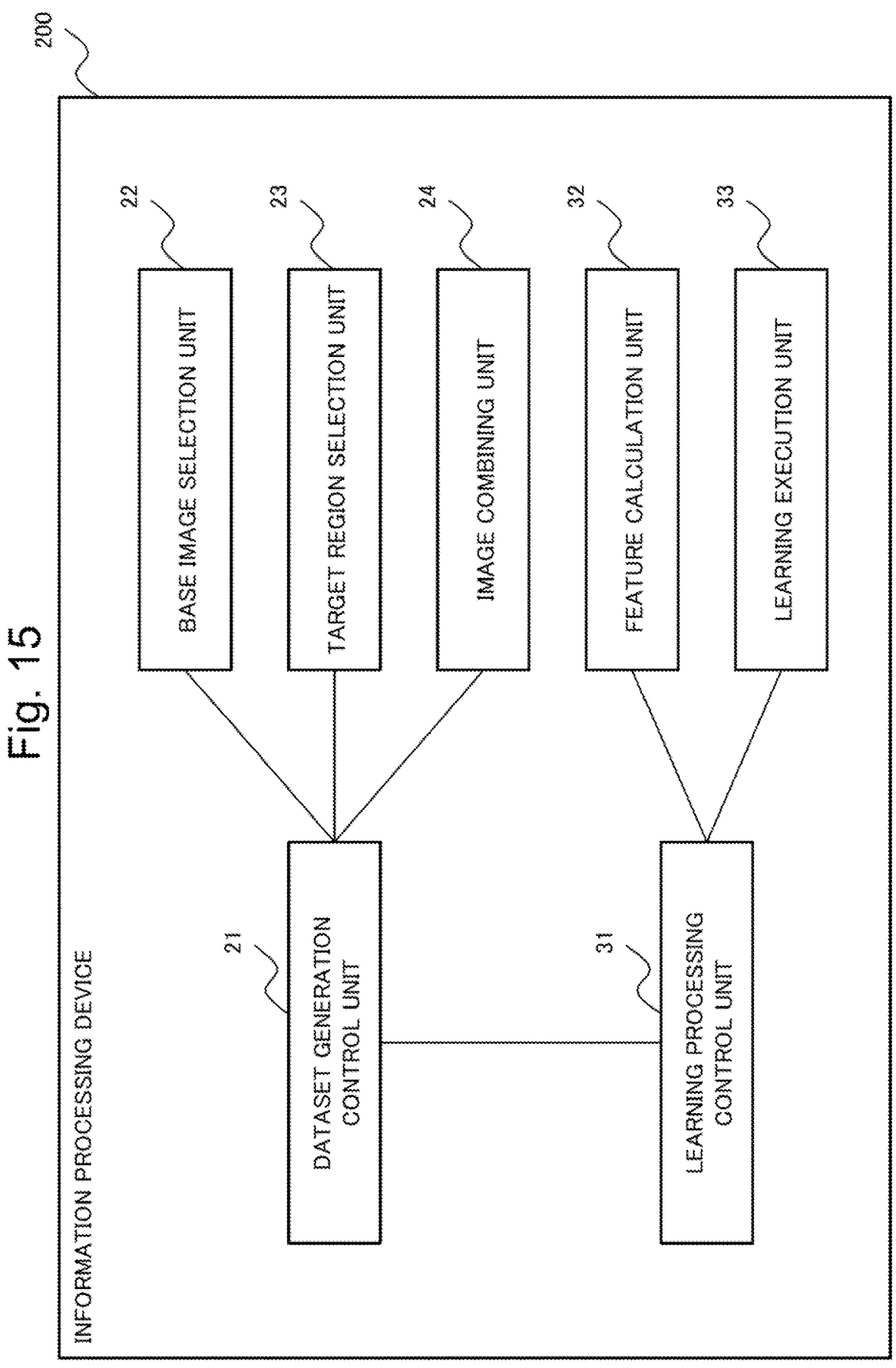
FIG. 15 is a block diagram illustrating an example of an outline of an example embodiment.

FIG. 15 is a block diagram illustrating a configuration of an information processing device 200 which is an example of an outline of an example embodiment. The information processing device 200 may be configured using a computer device as illustrated in FIG. 14, similarly to the first to third example embodiments.

The information processing device 200 includes a dataset generation-control unit 21, a base-image selection unit 22, a target-region selection unit 23, an image combining unit 24, a learning-processing control unit 31, a feature calculation unit 32, and a learning execution unit 33. Each configuration included in the information processing device 200 operates similarly to each component included in the dataset generation unit 20 and the learning processing unit 30 in the information processing device 1.

That is, the information processing device 200 generates a dataset for machine learning using a base dataset stored in an external device (not illustrated) or the like. The information processing device 200 calculates a feature of the generated dataset. Then, the information processing device 200 executes machine learning using the generated dataset and the calculated feature to generate a learned model.

The information processing device 200 may store the generated dataset in an external device (for example, a storage device (not illustrated) having a function similar to that of the dataset storage unit 40) not illustrated. Alternatively, the information processing device 200 may store the calculated feature in an external device (for example, a storage device (not illustrated) having a function similar to that of the feature storage unit 50).

[Description of Effects]

Similarly to the information processing device 1 of the first example embodiment, the information processing device 200 can achieve an effect of reducing a processing load in machine learning.

The reason is as follows.

The information processing device 200 includes a dataset generation-control unit 21, a base-image selection unit 22, a target-region selection unit 23, an image combining unit 24, a learning-processing control unit 31, a feature calculation unit 32, and a learning execution unit 33. The base-image selection unit 22 selects a base image from a base dataset that is a set of images including a target region including an object to be subjected to machine learning and a background region not including an object to be subjected to machine learning, and generates a processing target image that is a copy of the selected base image. The target-region selection unit 23 selects a target region included in another image included in the base dataset. The image combining unit 24 combines the image of the selected target region and the information on the object to be subjected to the machine learning included in the image of the target region with the processing target image. The dataset generation-control unit 21 controls the base-image selection unit 22, the target-region selection unit 23, and the image combining unit 24 to generate a dataset that is a set of processing target images obtained by combining a predetermined number of target regions. The feature calculation unit 32 calculates a feature of an image included in the dataset. The learning execution unit 33 generates a learned model using first machine learning that is machine learning using a feature and a dataset. The learning-processing control unit 31 outputs the learned model generated by controlling the feature calculation unit 32 and the learning execution unit 33.

As described above, the information processing device 200 operates similarly to the dataset generation unit 20 and the learning processing unit 30 in the first example embodiment. Therefore, the information processing device 200 can reduce the load of processing in machine learning.

The information processing device 200 has the minimum configuration of the first example embodiment and the like.

[Information Processing System]

Next, as a description of the information processing device 200, an information processing system 100 using a learned model generated by the information processing device 200 will be described.

Figure 16:
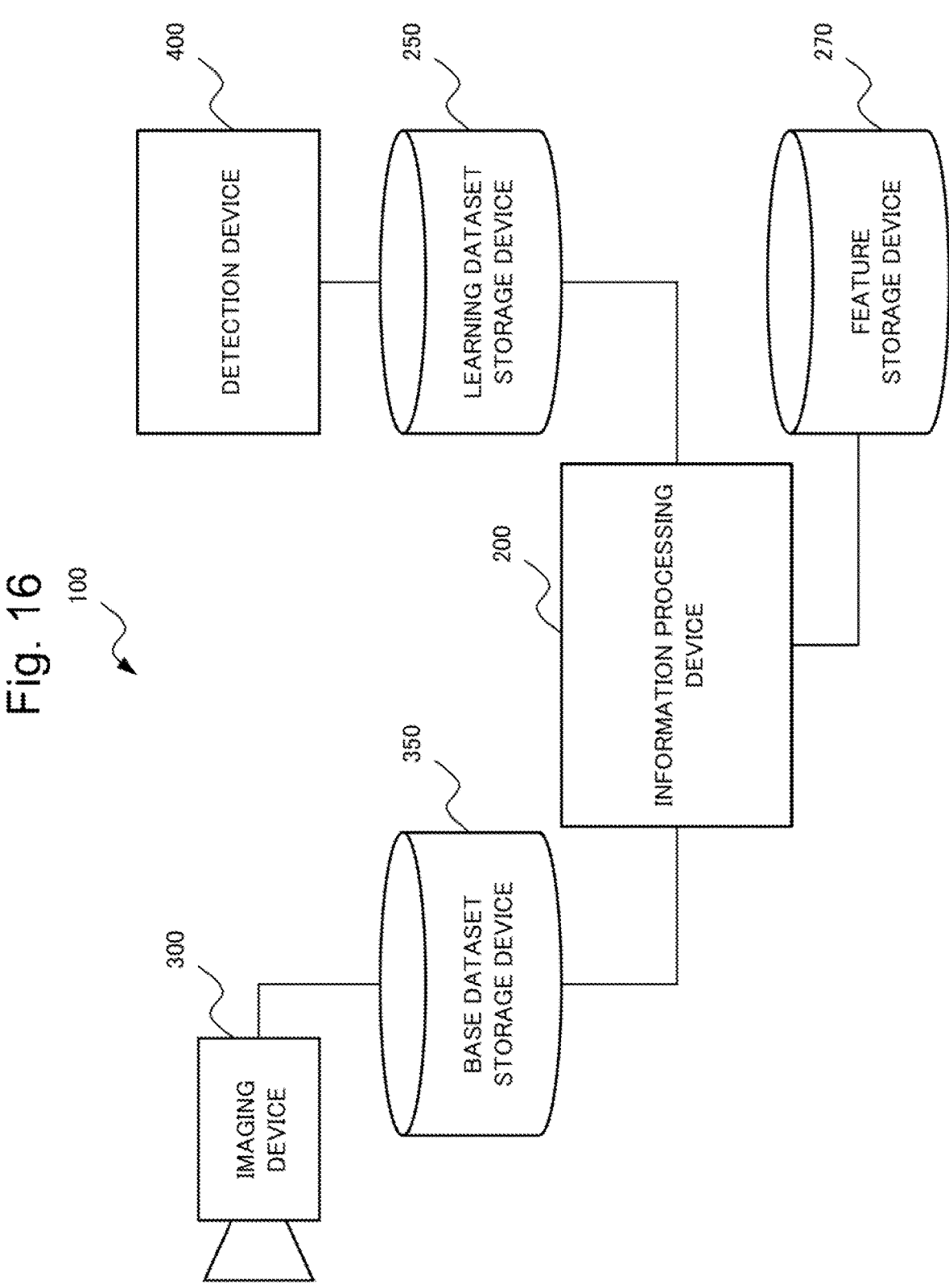
FIG. 16 is a block diagram illustrating an example of a configuration of an information processing system including an information processing device.

FIG. 16 is a block diagram illustrating an example of a configuration of an information processing system 100 including the information processing device 200.

The information processing system 100 includes an information processing device 200, a learning-dataset storage device 250, a feature storage device 270, an imaging device 300, a base-dataset storage device 350, and a detection device 400. In the following description, it is assumed that parameters necessary for the operation are set in the information processing device 200 in advance.

The imaging device 300 captures an image serving as a base dataset.

The base-dataset storage device 350 stores the captured image as a base dataset. An operator or the like of the information processing system 100 adds necessary information to the base dataset. For example, an operator or the like adds information on an object (detection target object) to be subjected to machine learning included in the base dataset to the base dataset. In addition of such information, an operator or the like may apply predetermined machine learning to the base dataset.

The information processing device 200 generates a dataset using the base dataset stored in the base-dataset storage device 350. Then, the information processing device 200 stores the generated dataset in the learning-dataset storage device 250.

Then, the information processing device 200 calculates the feature of the image included in the dataset, and stores the calculated feature in the feature storage device 270.

Then, the information processing device 200 executes machine learning using the feature stored in the feature storage device 270 and the dataset stored in the learning-dataset storage device 250.

Then, the information processing device 200 generates a learned model as a result of machine learning, and stores the learned model in the generated learning-dataset storage device 250.

The learning-dataset storage device 250 stores the dataset and the learned model generated by the information processing device 200. As described above, the learning-dataset storage device 250 is a device that implements a function corresponding to the dataset storage unit 40.

The feature storage device 270 stores the feature calculated by the information processing device 200. As described above, the feature storage device 270 is a device that implements a function corresponding to the feature storage unit 50.

FIG. 16 illustrates the base-dataset storage device 350, the learning-dataset storage device 250, and the feature storage device 270 as separate devices. However, some or all of these storage devices may be included in one device. In addition, these storage devices may implement functions other than the above. For example, any storage device may store the parameter.

The detection device 400 executes predetermined detection processing (for example, detection of an object in the acquired image) using the learned model generated by the information processing device 200.

The information processing device 200 reduces the load of machine learning processing in generating the learned model. Therefore, the information processing system 100 can reduce the processing load in the generation of the learned model used by the detection device 400.

The information processing system 100 may use any of the information processing devices 1, 1B, and 1C instead of the information processing device 200.

The present invention has been described above using the above-described example embodiments as exemplary examples. However, the present invention is not limited to the above-described example embodiments. That is, the present invention can apply various aspects that can be understood by those of ordinary skill in the art within the scope of the present invention.

REFERENCE SIGNS LIST

1 Information processing device
1B Information processing device
1C Information processing device
10 Learning control unit
10B Learning control unit
20 Dataset generation unit
20B Dataset generation unit
21 Dataset generation control unit
21B Dataset generation control unit
22 Base-image selection unit
22B Base-image selection unit
23 Target-region selection unit
23B Target-region selection unit
24 Image combining unit
30 Learning processing unit
30B Learning processing unit
30C Learning processing unit
31 Learning-processing control unit
31C Learning-processing control unit
32 Feature calculation unit
32C Feature calculation unit
33 Learning execution unit
33C Learning execution unit
40 Dataset storage unit
50 Feature storage unit
100 Information processing system
200 Information processing device
250 Learning-dataset storage device
270 Feature storage device
300 Imaging device
350 Base-dataset storage device
400 Detection device
600 Information processing device
610 CPU
611 Arithmetic unit
620 ROM
630 RAM
640 Internal storage device
650 IOC
660 Input device
670 Display device
680 NIC
690 Recording medium

What is claimed is:

1. An information processing device comprising:
a memory; and
at least one processor coupled to the memory,
the processor being configured to perform operations, the operations comprising:
    selecting a base image from a base dataset that is a set of images including a target region including an object to be subjected to machine learning and a background region not including an object to be subjected to machine learning, and generating a processing target image that is a copy of the selected base image;
    selecting the target region included in another image included in the base dataset;
    combining an image of the selected target region and information on an object to be subjected to machine learning included in the image of the target region with the processing target image;
    generating a dataset that is a set of the processing target images obtained by combining a predetermined number of the target regions;
    calculating a feature of an image included in the dataset;
    generating a learned model using first machine learning that is machine learning using the feature and the dataset;
    outputting the generated learned model;
    executing third machine learning that is machine learning using the dataset but does not reuse the feature;
    determining the feature to be reused using a result of profiling of an execution status of the third machine learning;
    executing the first machine learning using the determined feature and the dataset; and
    determining which output of a layer in a neural network is used as the feature to be reused using a result of profiling.

2. The information processing device according to claim 1, wherein the operations further comprise:
changing a shape of the selected target region.

3. The information processing device according to claim 2, wherein the operations further comprise:
executing at least one of a change of a width, a change of a height, a change of a size, a change of an aspect ratio, a rotation of an image, and a change of an inclination of an image as a change of the shape of the target region.

4. The information processing device according to claim 1, wherein the operations further comprise:
cutting out a foreground, which is a region of an object to be subjected to machine learning, from the target region, and combining the cut-out foreground with the processing target image.

5. The information processing device according to claim 1, wherein the operations further comprise:
executing the first machine learning using the base dataset or second machine learning different from the first machine learning, and evaluating a result of the first machine learning using the base dataset or the second machine learning using the base dataset; and
based on the evaluation, generating the dataset related to the evaluation.

6. The information processing device according to claim 5, wherein the operations further comprise:
evaluating accuracy of recognition of an object to be subjected to machine learning as a result of evaluation of the first machine learning using the base dataset or the second machine learning using the base dataset; and
generating the dataset in such a way that the dataset includes many objects with low recognition accuracy.

7. The information processing device according to claim 1, wherein the operations further comprise:
redetermining the feature to be reused using a result of profiling of the first machine learning using the feature determined to be reused and the dataset, and executing the first machine learning using the redetermined feature and the dataset.

8. An information processing method comprising:

selecting a base image from a base dataset that is a set of images including a target region including an object to be subjected to machine learning and a background region not including an object to be subjected to machine learning, and generating a processing target image that is a copy of the selected base image;

selecting the target region included in another image included in the base dataset;

combining an image of the selected target region and information on an object to be subjected to machine learning included in the image of the target region with the processing target image;

generating a dataset that is a set of the processing target images obtained by combining a predetermined number of the target regions;

calculating a feature of an image included in the dataset;

generating a learned model using first machine learning that is machine learning using the feature and the dataset;

outputting the generated learned model;

executing third machine learning that is machine learning using the dataset but does not reuse the feature;

determining the feature to be reused using a result of profiling of an execution status of the third machine learning;

executing the first machine learning using the determined feature and the dataset; and determining which output of a layer in a neural network is used as the feature to be reused using a result of profiling.

9. A non-transitory computer-readable recording medium embodying a program, the program causing a computer to perform a method, the method comprising:

selecting a base image from a base dataset that is a set of images including a target region including an object to be subjected to machine learning and a background region not including an object to be subjected to machine learning, and generating a processing target image that is a copy of the selected base image;

selecting the target region included in another image included in the base dataset;

combining an image of the selected target region and information on an object to be subjected to machine learning included in the image of the target region with the processing target image;

generating a dataset that is a set of the processing target images obtained by combining a predetermined number of the target regions;

calculating a feature of an image included in the dataset;

generating a learned model using first machine learning that is machine learning using the feature and the dataset;

outputting the generated learned model;

executing third machine learning that is machine learning using the dataset but does not reuse the feature;

determining the feature to be reused using a result of profiling of an execution status of the third machine learning;

executing the first machine learning using the determined feature and the dataset; and determining which output of a layer in a neural network is used as the feature to be reused using a result of profiling.

10. The information processing device according to claim 1, wherein the operations further comprise:

calculating, for each layer, a decrease in a load of entire machine processing when the output of the layer is used; and determining the output of the layer so that the load of the entire processing decreases.

\*    \*    \*    \*    \*